(12) United States Patent  
Segal et al.

(10) Patent No.: US 10,575,339 B2  
(45) Date of Patent: Feb. 25, 2020

(54) SCALABLE MOBILE AD HOC NETWORKS

(71) Applicant: MOBILICOM LTD., Azor (IL)

(72) Inventors: Yossi Segal, Azor (IL); Oren Elkayam, Azor (IL); Leon Shusterman, Azor (IL); Dafna Meron, Azor (IL)

(73) Assignee: MOBILICOM LTD., Shoham (IL)

( * ) Notice: Subject to any disclaimer, the term of this patent is extended or adjusted under 35 U.S.C. 154(b) by 0 days.

(21) Appl. No.: 15/779,541

(22) PCT Filed: Nov. 28, 2016

(86) PCT No.: PCT/IL2016/051272  
§ 371 (c)(1),  
(2) Date: May 28, 2018

(87) PCT Pub. No.: WO2017/090048  
PCT Pub. Date: Jun. 1, 2017

(65) Prior Publication Data  
US 2018/0352581 A1    Dec. 6, 2018

Related U.S. Application Data

(60) Provisional application No. 62/260,560, filed on Nov. 29, 2015.

(51) Int. Cl.  
*H04W 4/00*    (2018.01)  
*H04W 74/08*    (2009.01)  
(Continued)

(52) U.S. Cl.  
CPC ....... *H04W 74/0841* (2013.01); *H04W 8/005* (2013.01); *H04W 28/26* (2013.01);  
(Continued)

(58) Field of Classification Search  
CPC . H04W 74/0841; H04W 28/16; H04W 60/00; H04W 72/0446; H04W 8/005;  
(Continued)

(56) References Cited

U.S. PATENT DOCUMENTS

2005/0030968 A1    2/2005 Rich et al.  
2007/0047510 A1*   3/2007 Cho ...................... H04W 48/12  
                                                 370/338

(Continued)

OTHER PUBLICATIONS

Dror E. et al.; "Fast Randomized Algorithm for Hierarchical Clustering in Vehicular Ad Hoc Networks"; 10th IFIP Annual Mediterranean Ad Hoc Networking Workshop; 2011.

(Continued)

*Primary Examiner* — Chuong T Ho  
(74) *Attorney, Agent, or Firm* — Shichrur & Co.

(57) ABSTRACT

A collaborative network and method for transmission, the collaborative network comprising: a cluster of nodes, each of the plurality of nodes comprising a wireless transceiver, wherein each of the plurality of nodes is capable of operating as a cluster head and as a mesh node, wherein a first node of the plurality of nodes is dynamically configured to operate as a cluster head which allocates for other nodes time slots for transmission in accordance with a connectivity mesh scheme constructed dynamically based on reception quality by the plurality of the plurality of nodes, and all nodes in the plurality of nodes except the first node are dynamically configured to operate as mesh nodes, receiving and transmitting information, wherein transmitting the information is in accordance with the connectivity mesh scheme.

18 Claims, 13 Drawing Sheets

(51) Int. Cl.
  *H04W 72/02* (2009.01)
  *H04W 74/06* (2009.01)
  *H04W 8/00* (2009.01)
  *H04W 28/26* (2009.01)
  *H04W 56/00* (2009.01)
  *H04W 60/00* (2009.01)
  *H04W 72/04* (2009.01)
  *H04W 84/18* (2009.01)

(52) U.S. Cl.
  CPC ......... *H04W 56/001* (2013.01); *H04W 60/00* (2013.01); *H04W 72/02* (2013.01); *H04W 72/0446* (2013.01); *H04W 74/06* (2013.01); *H04W 84/18* (2013.01)

(58) Field of Classification Search
  CPC ... H04W 28/26; H04W 56/001; H04W 74/06; H04W 72/02; H04W 84/18
  USPC .................................................. 370/329, 330
  See application file for complete search history.

(56) References Cited

U.S. PATENT DOCUMENTS

| | | | |
|---|---|---|---|
| 2009/0034432 A1* | 2/2009 | Bonta | H04W 74/02 370/255 |
| 2009/0174547 A1 | 7/2009 | Greene et al. | |
| 2009/0262689 A1* | 10/2009 | Jeong | H04W 40/22 370/329 |
| 2010/0027480 A1* | 2/2010 | Palchaudhuri | H04L 41/12 370/329 |
| 2010/0131644 A1* | 5/2010 | Jeong | H04W 40/24 709/224 |
| 2010/0268825 A1* | 10/2010 | Jeong | H04W 72/04 709/226 |
| 2011/0038343 A1 | 2/2011 | Bhatti et al. | |
| 2012/0039218 A1* | 2/2012 | Palchaudhuri | H04L 41/12 370/256 |
| 2014/0328272 A1* | 11/2014 | Gottlib | H04W 24/02 370/329 |

OTHER PUBLICATIONS

International Search Report and the Written Opinion for International Application No. PCT/IL2016/051272, dated Feb. 20, 2017, 9 pages.

International Preliminary Report on Patentability for International Application No. PCT/IL2016/051272, dated May 29, 2018, 5 pages.

* cited by examiner

CONNECTIVITY GRAPH

INTERFERENCE GRAPH

ORIGINAL POLL RESPONSE TRANSMISSION

CLUSTERWIDE COOPERATIVE RELAYING OF POLL RESPONSE

SCALABLE MOBILE AD HOC NETWORKS

CROSS-REFERENCE TO RELATED APPLICATIONS

This application is a National Phase of PCT Patent Application No. PCT/IL2016/051272 having International filing date of Nov. 28, 2016, which claims the benefit of priority from U.S. Patent Application No. 62/260,560 filed on Nov. 29, 2015 entitled "Scalable Multichannel Mobile Ad Hoc Network Based on Dual Channel Wireless Mesh Routers." The contents of the above applications are all incorporated by reference as if fully set forth herein in their entirety.

TECHNICAL FIELD

The present disclosure relates to mobile networks in general, and to an apparatus and method for operating communication in scalable ad-hoc mobile networks, in particular.

BACKGROUND

Current mobile devices such as smartphones, laptop computers, tablet computers or others are equipped with wireless transceivers. In order to transmit or receive data, a mobile device, when not connected through a wired connection, needs to be connected to a wireless network, being any type of computer network that uses wireless data connections for connecting devices.

Wireless networking provides for using mobile devices in homes, telecommunication networks and enterprise (business) while avoiding the costly process of introducing cables into a building, and without forming connections between various equipment locations.

Wireless networks often need to adapt to different topologies, as devices join and depart from the network, distances between change and so do receiving qualities. These changes are particularly significant and fast when one or more devices are used in vehicles such as cars, trains, airplanes, ships or others.

A common network type is a wireless mesh network, made up of radio nodes organized in a mesh topology. In mesh networks, nodes forward messages on behalf of other nodes. Mesh networks can self heal automatically, by re-routing when a node has left or lost power.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

A first aspect of the disclosure relates to a collaborative network, comprising: a cluster of nodes, each of the plurality of nodes comprising a wireless transceiver, wherein each of the plurality of nodes is capable of operating as a cluster head and as a mesh node, wherein a first node of the plurality of nodes is dynamically configured to operate as a cluster head which allocates for other nodes time slots for transmission in accordance with a connectivity mesh scheme constructed dynamically based on reception quality by the plurality of the plurality of nodes, and all nodes in the plurality of nodes except the first node are dynamically configured to operate as mesh nodes, receiving and transmitting information, wherein transmitting the information is in accordance with the connectivity mesh scheme. Within the collaborative network, the transceiver of each node of the plurality of nodes is optionally adapted to transmit and receive data in two channels, and the plurality of nodes communicate over one channel of the two channels. Within the collaborative network, optionally all nodes except the first node receive information transmitted by the first node. Within the collaborative network, optionally all nodes except the first node are adapted to receive information and relay the information in accordance with the connectivity mesh scheme. Within the collaborative network, optionally multiple nodes collaborate in transmission. Within the collaborative network, multiple nodes optionally collaborate in synchronous transmission by transmitting and relaying or repeating data synchronously. Within the collaborative network, the synchronous transmission is optionally in accordance with the connectivity mesh scheme. Within the collaborative network, the first node is optionally further adapted to determine the connectivity mesh scheme in accordance with connectivity levels between node pairs reported by nodes in the cluster. Within the collaborative network, the first node is optionally further adapted to determine the connectivity mesh scheme by determining interference levels between node pairs. Within the collaborative network, the connectivity mesh scheme is optionally determined in intervals according to a rate of changes in connectivity levels as reported. Within the collaborative network, the multiplicity of nodes optionally use Media Access Control (MAC) layer relaying for transmitting commands from the cluster head and Logical Link Control (LLC) layer relaying for repeating data received from other nodes. Within the collaborative network, the cluster of nodes and a second cluster of nodes optionally have a common node. Within the collaborative network, the cluster of nodes and the second cluster of nodes optionally use two different channels and the common node is able to communicate using the two different channels. Within the collaborative network, optionally at least one of the plurality of nodes has a client device connected to thereto. The collaborative network is optionally integrated into a global Mobile IP (MIP) infrastructure.

Another aspect of the disclosure relates to a method for transmission in a collaborative network, the method comprising: forming a cluster of nodes, each of the plurality of nodes comprising a wireless transceiver, wherein each of the plurality of nodes is capable of operating as a cluster head and as a mesh node, wherein a first node of the plurality of nodes is dynamically configured to operate as a cluster head which allocates for other nodes time slots for transmission in accordance with a connectivity mesh scheme constructed dynamically based on reception quality by the plurality of the plurality of nodes, and all nodes in the plurality of nodes except the first node are dynamically configured to operate as mesh nodes, receiving and transmitting information, wherein transmitting the information is in accordance with the connectivity mesh scheme; determining by the cluster head a connectivity mesh scheme for transmitting messages within the cluster; and transmitting a message within the cluster wherein nodes transmit or relay the message in a timeslot in accordance with the connectivity mesh scheme, synchronously with other nodes. Within the method, the first node optionally determines the connectivity mesh scheme in accordance with connectivity levels and interference levels between node pairs reported by nodes in the cluster. Within the method, the connectivity mesh scheme is optionally determined in intervals according to a rate of changes in connectivity levels as reported. Within the method, the cluster of nodes and a second cluster of nodes optionally have a common node, wherein the cluster of nodes and the second cluster of nodes use two different channels and the common node is able to communicate using the two different channels. The method can further comprise integrating the collaborative network into a MIP infrastructure. Within the method, the cluster head optionally resolves collisions between nodes competing for randomly accessible air resources, by creating and managing groups of competitors and assigning probabilities for random access.

BRIEF DESCRIPTION OF THE DRAWINGS

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Figure 1:
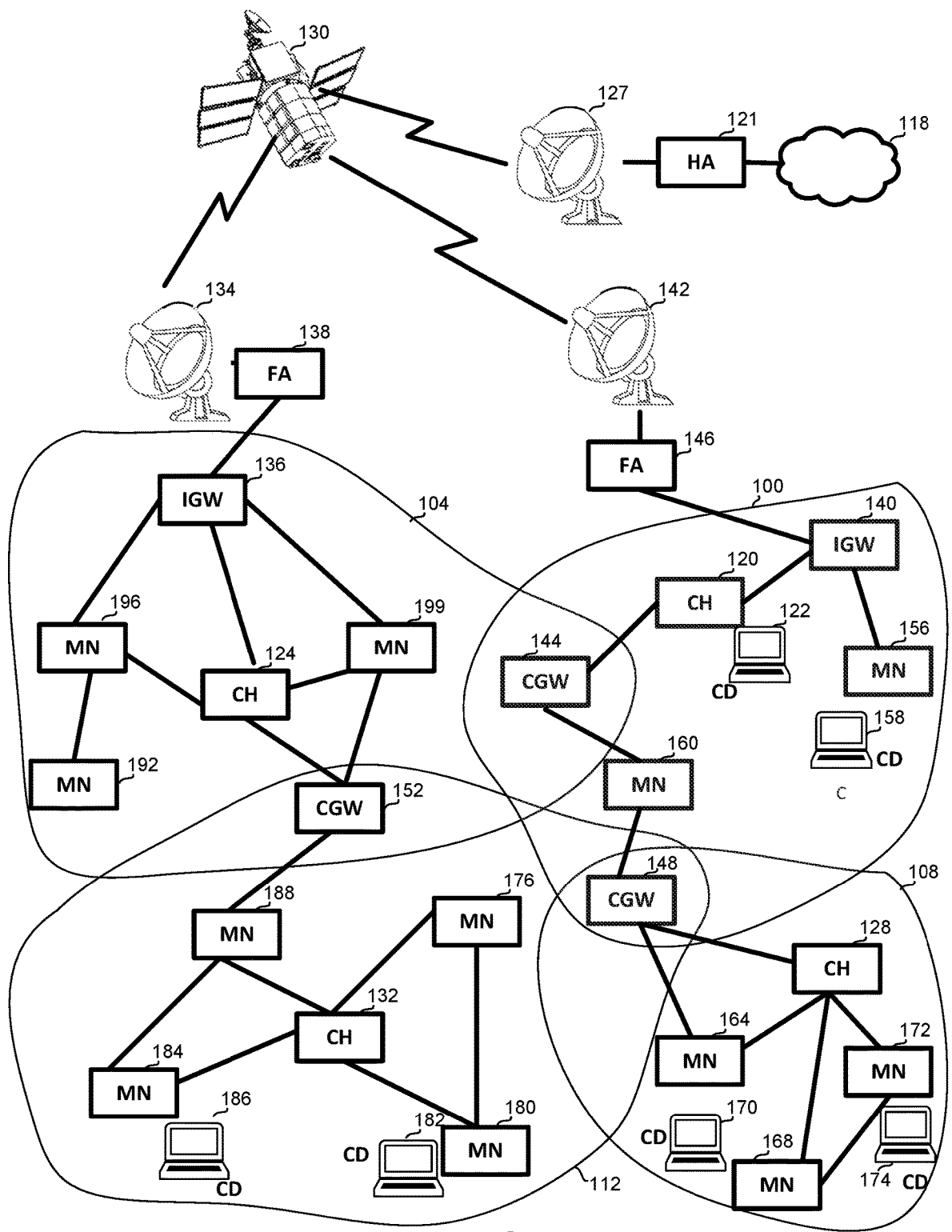
FIG. 1 is a schematic drawing of an exemplary ad-hoc network, in accordance with some exemplary embodiments of the disclosure.

The disclosure relates to mesh networks for connecting an arbitrary number of mobile devices each connected to or comprising a wireless router, arranged in arbitrary topology. Each wireless router in the network may be referred to as node, or a mesh node.

In mobile networks, where devices may change locations and thus enter or exit the receiving range of one another, the mesh network topology and receiving quality may change in fast pace, which may interrupt communication or reduce its quality.

Thus, it may be desired to provide routers which may form a network that ensures robust and efficient communication under changing topology conditions.

In accordance with some embodiments of the disclosure, there is thus provided a communication network which may consist of one or more clusters, each comprising a number of nodes, wherein nodes within the cluster receive transmissions of other nodes in the cluster or in some cases in neighboring clusters. Thus, the number of nodes in a cluster may be bound, in order to limit the number of transmissions received by each router and thus provide network scalability. In some exemplary embodiments, the number of nodes in each cluster may be limited to 32. The nodes within each cluster may communicate in one channel, characterized in specific frequencies or time slots.

Transmission between different clusters is enabled by each node being able to communicate in two or more frequencies. Thus, each node communicates with other nodes in its cluster using a specific frequency, and some nodes, referred to as Cluster Gateway (CGW) belonging to two or more clusters communicate in the two channels, such that communication with nodes of either cluster is done in the channel of the respective cluster. It will be noted that clusters having no common node, due for example to geographic distance may use the same channel.

In each cluster, one of the nodes is selected by the cluster nodes to be cluster head, while all other nodes are mesh nodes. It will be appreciated that any node may be selected as cluster head, and that the distribution of the nodes into clusters, as well as the selection of the cluster head is dynamic and may change as nodes change their geographic locations, the reception quality changes, or the like. Thus, each node may be able to function as a regular node as well as a cluster head, and may switch between the two modes.

The cluster head may be selected, in any required manner, for example as described in "Fast Randomized Algorithm for Hierarchical Clustering in Vehicular Ad Hoc Networks" by Dror et al. published in the 10th IFIP Annual Mediterranean Ad Hoc Networking Workshop on 2011, incorporated herein by reference for al purposes. It will be appreciated that the cluster head may selection may have to be repeated when the topology changes, or due to other reasons.

In each cluster, the cluster head determines a connectivity mesh scheme indicting direct and indirect connectivity levels and interference levels between nodes in the cluster. The connectivity mesh scheme is subject to change dynamically as nodes change their location and reception levels change. Upon the connectivity mesh scheme, the cluster head schedules communication by polling nodes such that each node can request allocation of transmission time, and allocating time slots for the requested transmission for each node that so requested. The mesh nodes may repeat the polling, allocating and some actual data they receive, in order to ensure that all other nodes that need to receive the transmission, indeed receive it, thus ensuring communication robustness. If multiple repetitions are allowed, the chances of each transmission to be received increase. However, in such case the energy consumption and interference probabilities may increase as well. Thus, the number of repetitions may be determined by the cluster head in accordance with connectivity and interference data among nodes, as provided by the nodes. Connectivity between nodes refers to a first node directly receiving transmission from a second node, while interference relates to a first node receiving transmission by a second node directly or through one or more intermediate nodes repeating the transmission.

Thus, a network in accordance with the disclosure provides for scalable wireless mesh networking through dynamically created interconnected clusters, wherein neighboring clusters operate on mutually non-interfering channels. The network provides for cooperative multihop broadcasting of MAC control messages, including for example transmission schedules, transmission time reservation requests, registration requests, polling, or the like.

The network provides for robust and efficient transmission, in dynamic environment in which the network structure and the cluster head roles may change.

The limited number of cluster members provides for efficient multicast polling, i.e., giving the opportunity to each node to broadcast at a predetermined time frame, and for collision detection.

A network in accordance with the disclosure provides for cooperative relaying of data frames even in the presence of frequent topology changes, for example when mobile devices are used in moving vehicles. The network is cooperative and collaborative as multiple nodes collaborate in transmitting messages. The transmission and relaying or repeating data are done synchronously as scheduled by the CH.

A network in accordance with the disclosure provides for integrating route resolution with proxy address resolution and virtual networking, thus allowing freedom in configuring the IP stacks of the client devices.

The routing protocol of the disclosed network may be integrated with Mobile IP, thus providing for macro-mobility.

Reference is now made to FIG. 1, showing an exemplary ad-hoc network in accordance with the disclosed subject matter.

The network connects to the Internet via Mobile IP (MIP) protocol, designed to allow mobile devices to move from one network to another while maintaining a permanent IP address.

In FIG. 1, as well as throughout the document, and unless indicated otherwise, the terms below have the following meanings:

MN (mesh node) relates to a device with at least one Ethernet or data interface and at least one RF interface. The MNs are the nodes that form the mobile mesh network.

CH (cluster head) relates to a virtual concentrator of the cluster, responsible for resource allocation and transmission scheduling within the cluster. The CH is dynamically elected between the MNs of a cluster.

CD (Client Device) relates to an IP host connected or attached to an MN via the Ethernet or data interface. Multiple CDs may be attached to each MN.

CGW (Cluster Gateway) relates to an MN which may be associated with more than one cluster simultaneously. The CGW may act as communication gateway between clusters it is associated with.

IGW (Infrastructure Gateway) relates to an MN which is connected to a Mobile IP infrastructure network via the Ethernet interface.

FA (Foreign Agent) relates to the Mobile IP Foreign Agent. It provides IP Mobility foreign services for the MNs, which act in this respect as the MIP Mobile Nodes and as MIP Proxies for the CDs. Thus, the FA provides for foreign services since it serves visiting nodes.

HA (Home Agent) relates to the Mobile IP Home Agent. It provides for the IP Mobility home services for the MNs, which act in this respect as the MIP Mobile Nodes and as MIP Proxies for the CDs. The HA hides mobility from the legacy static world. From the point of view of deices external to the network, the mobile node never leaves the home network, while in reality it may move to the foreign network where it is served by an FA.

The network comprises a multiplicity of routers 120, 124, 156, 140, 144, 160, 148, 128, 164, 172, 168, 152, 176, 188, 132, 180, 184, 192, 196, and 199, also referred to as MNs (mesh nodes). Each router may be capable of operating over at least two wireless channels. Additionally, each router may have one or more wired interfaces to which client devices may connect. Although wireless mesh routers are mobile, the client devices may be agnostic to mobility and do not need any mobility support to be introduced into their protocol stacks. Thus, some non-mobile routers, such as 120 or 168 are connected, respectively, to client devices (CDs) 122 and 170. The connection may use a fixed wired infrastructure. Each CD may be a server, a desktop computer, a smartphone, a laptop, a personal digital assistant, a tablet, or the like. Thus the mobile ad-hoc network may become an integral part of the global Internet, wherein Mobile IP (MIP) is used to ensure seamless mobile connectivity of each cluster with the rest of the world. The wireless mesh routers provide for proxy MIP clients on behalf of the client devices connected.

The routers are divided into four clusters 100, 104, 108 and 112, which are interconnected by CGWs 144, 148 and 152. The clusters may geographically overlap thus creating contiguous coverage areas. A CGW belongs to two or more clusters and thus acts as a communication gateway between clusters.

Each cluster has exactly one Cluster Head (CH), such as CH 120 of cluster 100, CH 124 of cluster 104, CH 128 of cluster 108, and CH 132 of cluster 112. The nodes within each cluster communicate in one channel, therefore a CGW may need to be able to communicate in frequencies of all clusters it belongs to. Thus, CGW 148 may need to communicate in three different channels, while CGWs 144 and 152 may need to communicate in two channels each. It will be appreciated that clusters 104 and 108 can communicate in the same channel, since they have no common nodes and no geographic overlap.

The network is connected to the Internet 118, via HA 121 connected through a device such as satellite dish 127 to satellite 130. The MIP HA provides for the IP Mobility home services for the MNs, which act in this respect as the MIP MNs Nodes and as MIP Proxies for the CDs. Satellite 130 may connect through satellite dishes 134 and 142 to mobile IP FAs 138 and 146, respectively. The MIP FAs provide IP Mobility foreign services for the MNs, which act as the MIP MNs and as MIP proxies for the CDs. Each FA, such as FAs 138 and 146, is connected to the network by an infrastructure Gateway (IGW), such as IGWs 136 and 140, respectively.

Figure 2A:
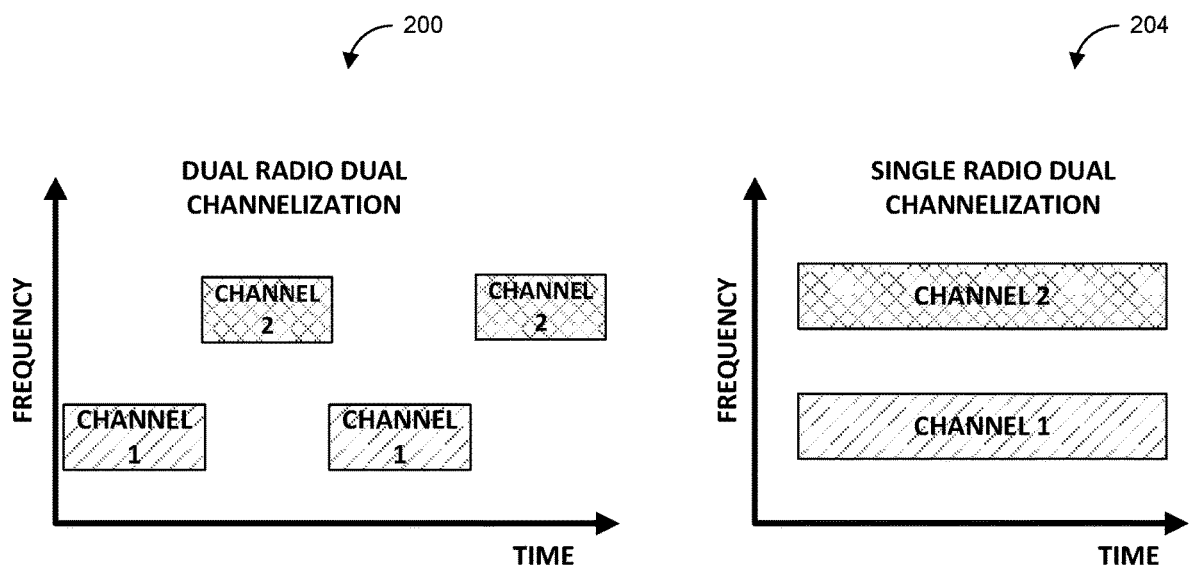
FIG. 2A shows illustrations of two options for radio dual channelization, in accordance with some exemplary embodiments of the disclosure.

Referring now to FIG. 2A, showing two options for dual channelization: diagram 200 shows a single radio dual synchronization arrangement, in which the radio uses two frequencies: a first frequency for channel 1, and a second frequency for channel 2, and operates at said frequencies in non-overlapping time slots.

Diagram 204 shows a dual radio dual synchronization arrangement, at which two radios operate concurrently at the two different frequencies. Thus, a node in accordance with the disclosure can operate in two channels, whether as a single radio dual channelization, or as a dual radio dual channelization.

Figure 2B:
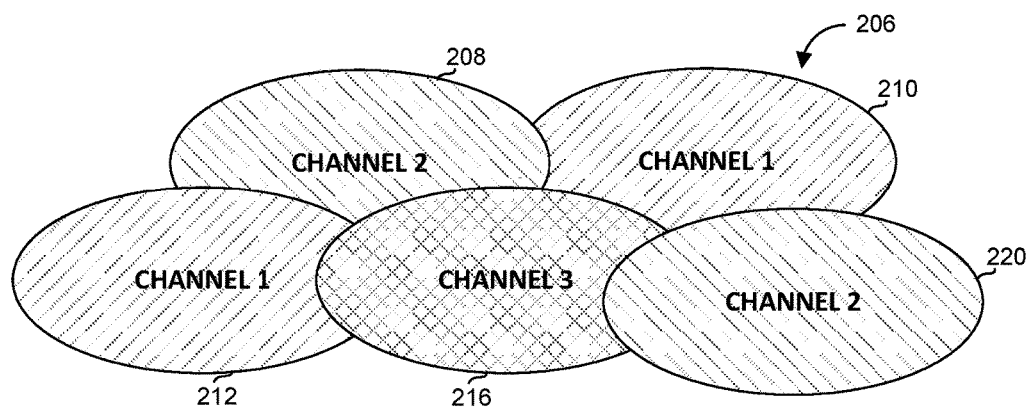
FIG. 2B shows overlapping and non-overlapping network clusters, in accordance with some exemplary embodiments of the disclosure.

Reference is now made to FIG. 2B, that demonstrates that nodes having no geographic overlap can use the same frequency or frequencies. Thus, networks 210 and 212 can both use channel 1, and similarly for networks 208 and 220 using channel 2. Network 216 has overlap with all other networks and thus has to use a different frequency.

Figure 3A:
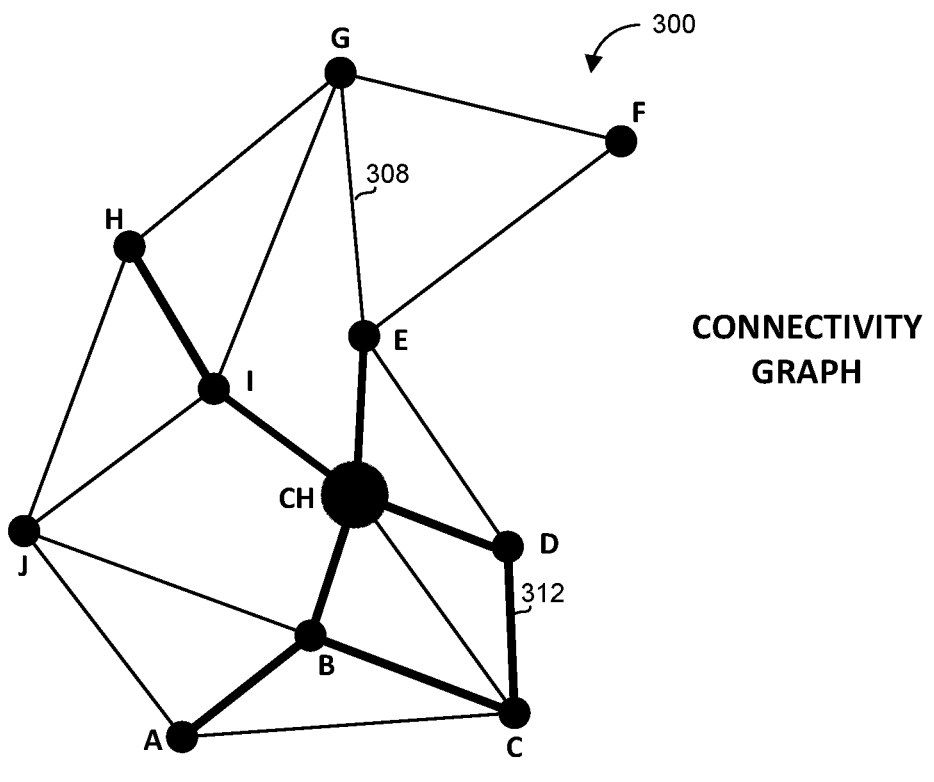
FIG. 3A shows a flowchart of steps in an exemplary communication method, in accordance with some exemplary embodiments of the disclosure.
Figure 3A:
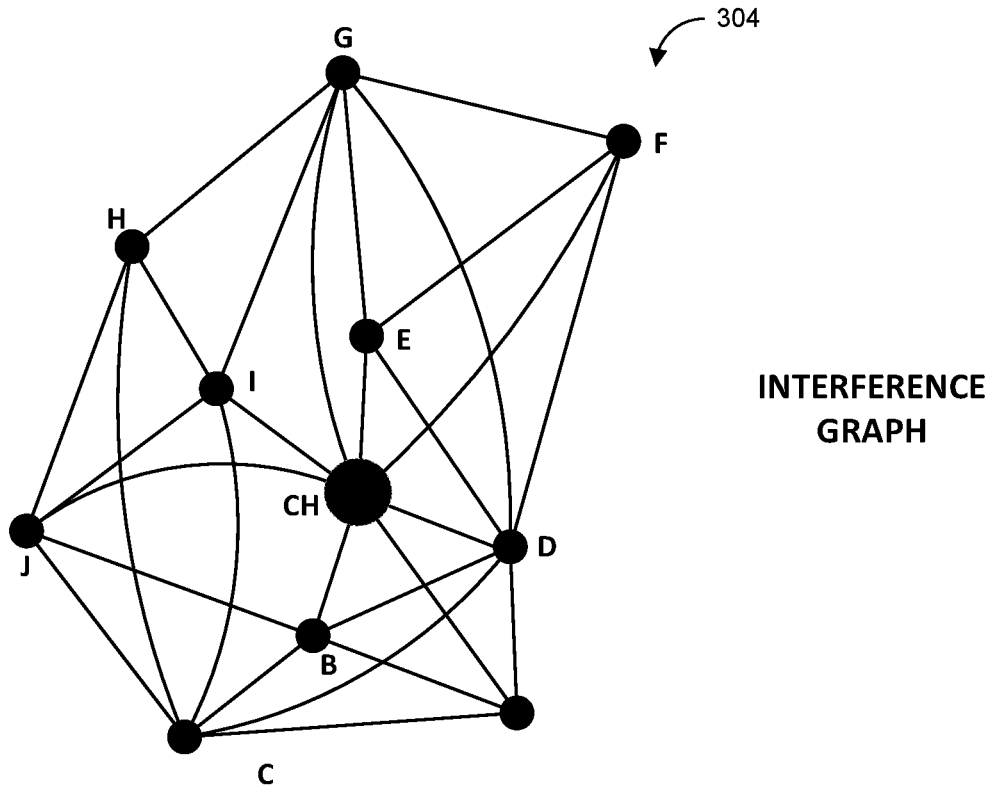

Referring now to FIG. 3A, showing exemplary connectivity and interference graphs within a cluster of MNs. Depending on the adaptive modulation and coding used for transmission, some MNs are able to sense transmissions of some other MNs even if the transmission is not fully and successfully received. Thus, due to the caused interferences, the ability of an MN to receive data from a neighboring MN can be aversively affected by transmission of a more distant MN. These relationships may be modeled as two graphs, shown in FIG. 3: connectivity graph 300 and interference graph 304. For simplicity, the example is reduced to a non-directed graph which implies symmetry, however in some cases the graphs have to be directed since the edges may have different attributes (such as AMC or transmission power) in each direction.

Connectivity graph 300 may comprise a node marked by a letter for each mesh node, and an edge for any two nodes that directly receive one another's transmission. The width of each edge may indicate the communication scheme, thus bold edges such as edge 312 may indicate communication using 16QAM constellation and 0.7 FEC rate, while other edges such as edge 308 may indicate communication using QPSK constellation and 0.5 FEC rate.

It will be appreciated that the graph may change when one or more new nodes are added, one or more nodes leave the graph, or the reception level between two nodes change, which may make edges appear of disappear. Further, the node functioning as CH may change from time to time.

It is noted that interference graph 304 is always at least as dense as connectivity graph 300, since any communication between nodes as reflected in the interference graph, includes but is not limited to direct communication between the nodes as reflected in the connectivity graph. An exception to this might occur when the signals are beam-formed, in which case the communication is directed, but such configuration is less adequate for mobility.

The CH of each cluster may be responsible for allocating radio resources and scheduling transmissions opportunities for the other MNs in the cluster. In order to do that, the CH may need the connectivity and interference graphs information, and a demand list, which comprises the amounts of data to be delivered by each source MN to each destination MN.

The MNs may announce their demands to the CH by submitting reservation requests, for example in response to a multicast poll or to a unicast poll as detailed below. In another alternative, the requests may be piggybacked on data transmission.

Delivering the data from the source to the destination may require scheduling transmission times for the source nodes, as well as scheduling transmissions to the nodes involved in multihop relaying. Relaying can use MAC Layer Relaying (MLR) in which entire timeslots are relayed. MLR allows for cooperative relaying, but wastes bandwidth if a timeslot cannot be filled with data destined to the same MN. Additionally or alternatively, relaying can use LLC Layer Relaying (LLR) in which Media access control Protocol Data Units (MPDUs) are relayed.

Figure 3B:
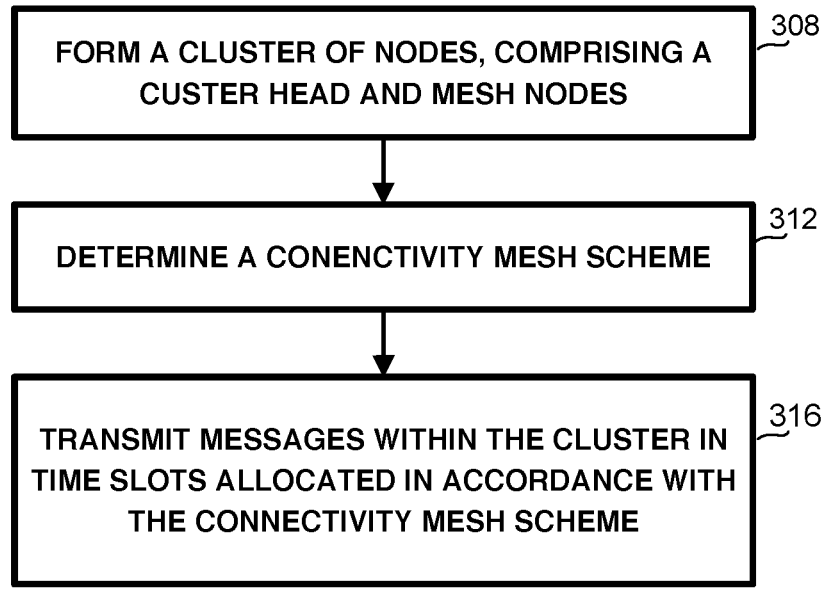
FIG. 3B shows an a flowchart of steps in a method for transmission, in accordance with some exemplary embodiments of the disclosure.

Referring now to FIG. 3B, showing a flowchart of steps in an exemplary communication method, in accordance with the disclosure.

At step 308 a network of nodes is formed, comprising a cluster head and a multiplicity of mesh nodes, wherein the roles are dynamic and the cluster head role can be assigned to another node.

At step 312 the cluster head may determine a connectivity mesh scheme, in accordance with connectivity levels and interference levels provided by the mesh nodes. The connectivity mesh scheme may be updated dynamically as conditions change.

At step 316 messages are transmitted and relayed within the cluster in time slots allocated in accordance with the connectivity mesh scheme, and synchronously with other nodes.

Figure 4A:
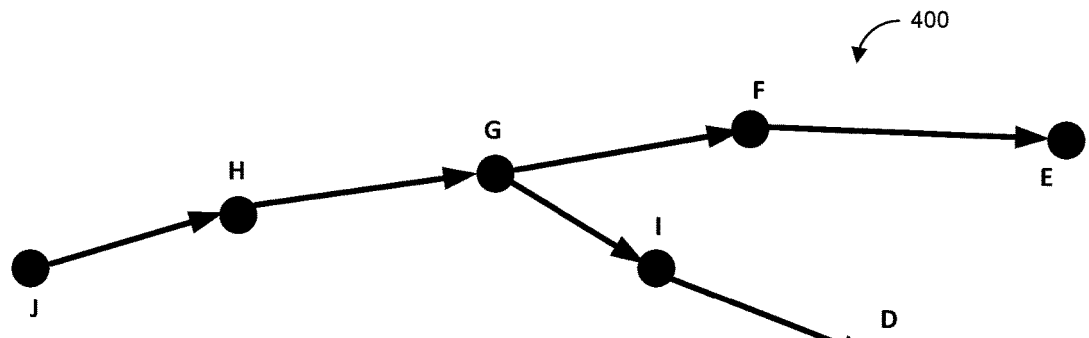
FIG. 4A shows an exemplary partial graph in which data is relayed, in accordance with some exemplary embodiments of the disclosure.
Figure 4B:
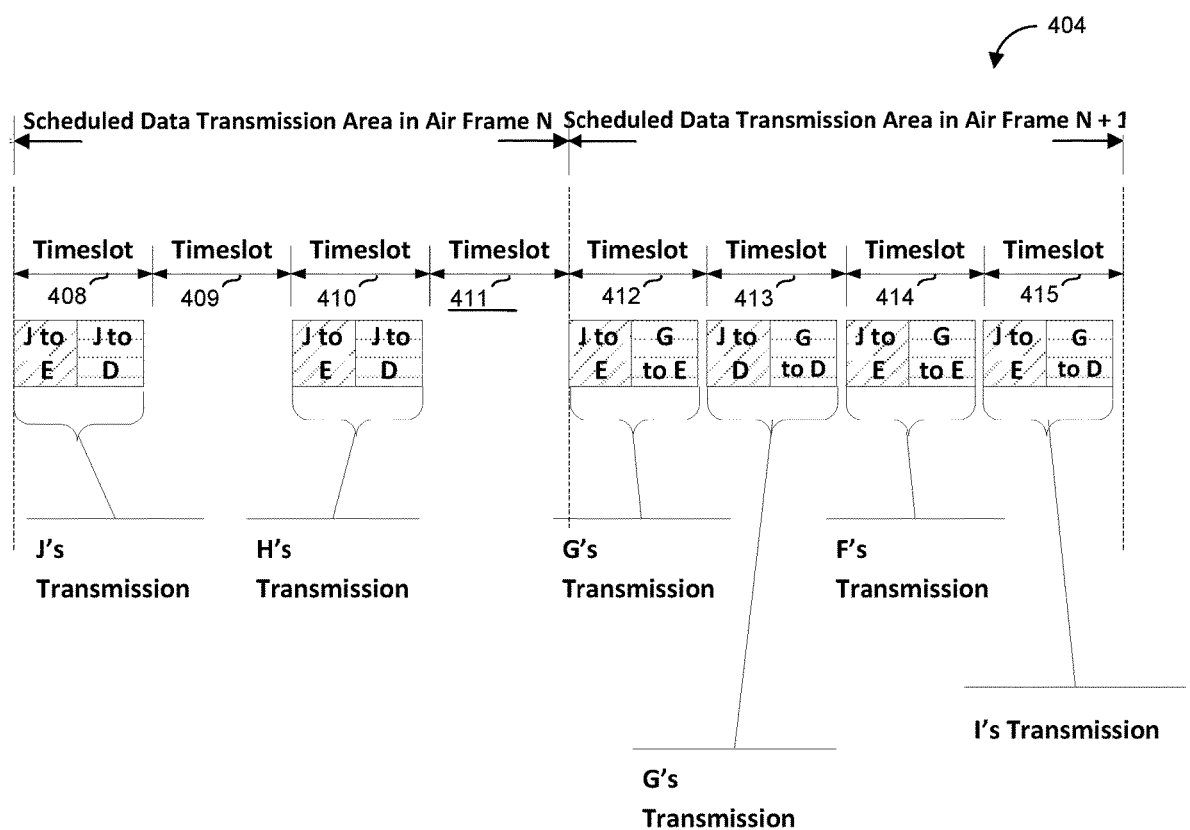
FIG. 4B shows a schematic structure of air frames transmitting data in the graph of FIG. 4A, in accordance with some exemplary embodiments of the disclosure.

Referring now to FIG. 4A and FIG. 4B, demonstrating the usage of the two relaying options. The graph of FIG. 4A, generally referenced 400, shows a number of nodes from connectivity graph 300 and interference graph 304, in which it is required to transmit information from J to E and to D, and from G to E and to D.

Table 404 of FIG. 4B, shows the transmission of the data in two consecutive air frames, each comprising four time slots. On the first air frame, referenced N, J has to transmit first information to D and second information to E. Since neither of the first information or the second information is enough to fill an entire timeslot, J transmits timeslot 408 which contains data for D and data for E. The transmission at timeslot 408 may be a MAC Layer transmission or an LLC layer transmission relayed to G by H. H can also use LLC layer relaying for that purpose, wherein the decision of which technique to use is made by the CH. In some embodiments, the CH, having information of the available resources, may assess which technique would be more efficient while not compromising the Quality of Service (QoS) constrains. On timeslot 410, the data transmitted by J and received by H is relayed by H to D and to E. It will be appreciated that timeslots 409 or 411 could also be used, since the CH's scheduler has to pick up one slot out of the available timeslots, wherein in the current example there are four such timeslots. Since only two timeslots are needed for this transaction, the remaining timeslots may remain idle or be used by another node scheduled for these timeslots.

On the second air frame, referenced N+1, on timeslot 412 G relays the information received from J and addressed to E. Additionally G transmits G's information addressed to E. Similarly on timeslot 413, G transmits the information received from J and addressed to D, as well as G's information addressed to D. On time slot 413 F relays the information it received from G and addressed to E, including the information originating from J and from G itself, and similarly on timeslot 414 I relays the information it received from G and addressed to D, including the information originating from J and from G itself. The above detailed timeslots are relayed by F and I using either MAC or LLC Layer Relaying.

As part of maintaining the connectivity and interference graphs, each MN periodically transmits a representation of the parts of the connectivity graph for which it has information about, at the moment of transmission, such that the CH can determine how to transmit scheduling information to all MNs and how to route information from one MN to another. These periodic transmissions may be referred to as topology probes. The topology probes serve double purpose: 1) distribution of the topology information and 2) measuring the quality of the signal by each neighboring node. In some embodiments, the topology probes are not relayed. The CH may announce a schedule for each MN's topology probe in a Frame Control Broadcast (FCB) which is transmitted at the beginning of an airframe and describes the structure of the current air frame. Thus, the transmission time allotted to each MN is known in advance, such that if the transmission cannot be decoded, it may still be used for building the interference graph if not the connection graph.

Initially the graph known to an MN includes only the MN's neighbors, but grows with each iteration as the MNs learn about their neighbors' neighbors, to include all MNs of the cluster.

The CH periodically announces the connectivity and interference graph in the FCB, and all MNs may synchronize their internal representations of the graph with the one transmitted by the CH.

Figure 5A:
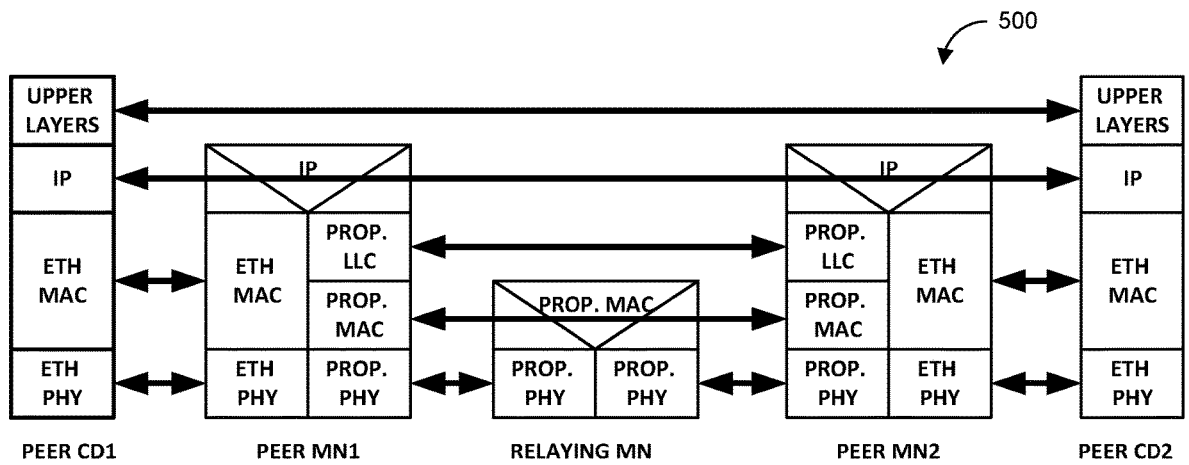
FIGS. 5A and 5B show MAC and LLC layer relaying protocols, respectively, in accordance with some exemplary embodiments of the disclosure.
Figure 5B:
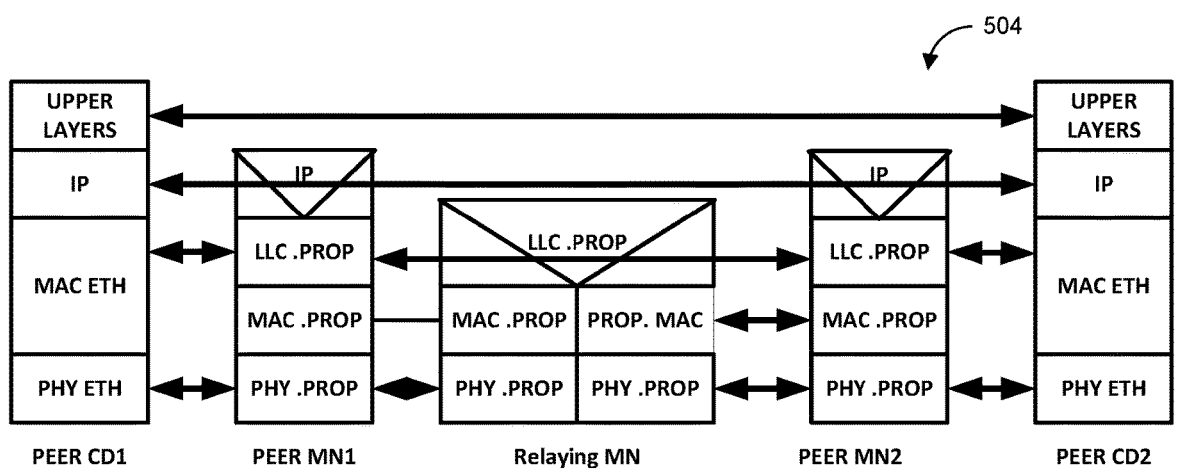

Referring now to FIGS. 5A and 5B, showing MAC and LLC layer relaying protocols, respectively. The term prop. in FIGS. 5A and 5B relates to transmission using a proprietary protocol.

Referring now to FIG. 5A, showing a diagram of the MAC Layer Relaying protocol. With MAC Layer Relaying, entire timeslots are relayed and the relaying is a part of a medium access session. In order to schedule a transmission between two neighbors in the connectivity graph, the CH needs to specify the exact starting time, duration and AMC of the transmission. If the source and destination nodes are not directly connected, the CH explicitly specifies which MNs and when should relay the transmission.

It will be noted that interference between two nodes is not necessarily destructive. If two MNs relay exactly the same data during the same time period, the signals may sum up constructively and amount to successful reception of the data. Such cooperative relaying is possible, however, only with robust AMC and thus is rarely used for relaying unicast transmissions. Cooperative relaying may be routinely used, however, for delivering broadcast announcements from the CH to all other MNs and for delivering reservation requests which are sent in response to multicast or unicast polling.

Clusterwide cooperative relaying is a special kind of relaying, in which every MN which receives and decodes a transmission relays it during a time period scheduled for relaying. In some embodiments, this operation is performed only once, i.e., no MN participating in the clusterwide cooperative relaying may relay the same transmission twice to avoid circles.

Referring now to FIG. 5B, showing a diagram of the LLC Layer Relaying protocol. With LLC Layer, MPDUs are relayed rather than timeslots, and relaying is a part of the same LLC session. In order to enable such relaying, the CH allocates transmission opportunities also for the intermediate relays. The allocations must be large enough to accommodate the data originated at the relaying node as well as the relayed data and.

Figure 6:
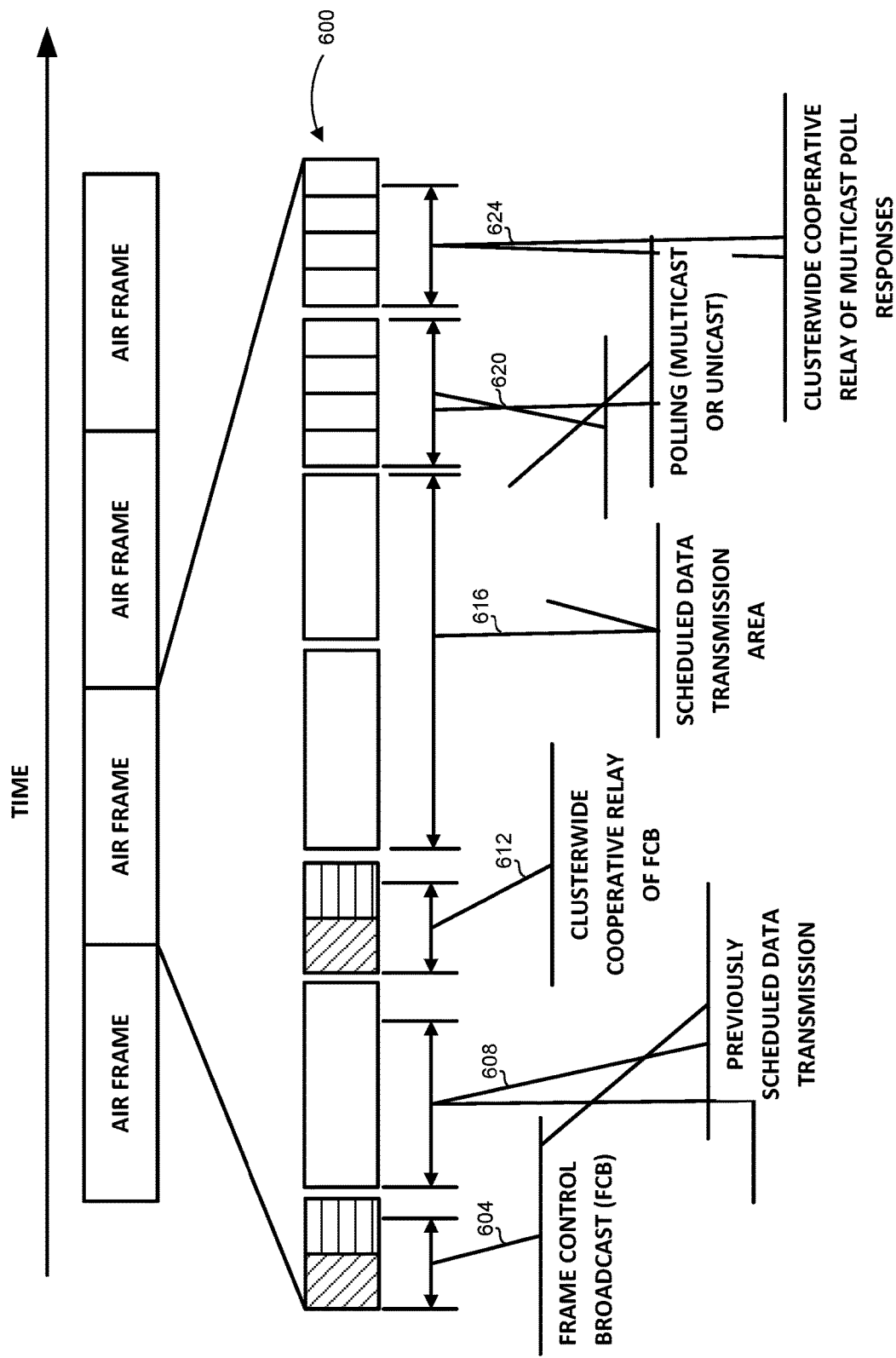
FIG. 6 shows an exemplary composition of an air frame, in accordance with some exemplary embodiments of the disclosure.

Referring now to FIG. 6, showing the composition of an air frame 600, in accordance with some embodiments of the disclosed subject matter. In some embodiments, the transmissions are grouped into the air frames of constant duration. Each air frame starts with an FCB 604 describing the composition of the current air frame. FCB 604 may be immediately followed by transmission 608 scheduled in the FCB of an earlier frame. In some embodiments, the transmission schedule is persistent, i.e., is scheduled periodically and used for period of time, and thus is not required to be announced in every air frame. Thus, if there are no updates the FCB can contain no information. Transmission 608 may then be followed by clusterwide cooperative relay (CCR) transmission 612. CCR transmission 612 is used for bridging the time gap between the transmission of an FCB and cooperative relaying of the FCB. The relaying nodes need to receive the transmission and decode it, and make sure it is received error-free, only after which they can relay the FCB. However, the decoding and error checking requires time, thus it is required to put some space between the transmission of a piece of information and relaying this transmission. It will be appreciated that this time gap is also required for any other relaying and not only for FCB.

CCR transmission 612 may include the scheduled data transmission area 616, intended for original and relayed transmissions, and detailed in association with FIG. 4 above. The air frame may be optionally concluded by polling timeslots 620, allocated for multicast or unicast polls intended for allowing the MNs to announce their demands for transmission time. The poll transmission. Polling timeslots 620 may be followed by a timeslot for clusterwide cooperative relay of multicast poll responses 624, i.e., relaying the poll responses transmitted by the MNs. It will be appreciated that clusterwide cooperative relay is used for multicast poll responses since it is not known in advance which mobile node will respond to the poll. Thus relaying should be done by whoever is able to overhear the transmission. Unicast messages including unicast poll responses, however, may be relayed in a controlled fashion when the CH assigns in advance a set of nodes that would relay a specific transmission. This set is usually significantly smaller than the whole cluster, thus increasing efficiency in unicast polling Polling, i.e., giving the MNs an opportunity to request data transmission time, may relate to multicast polling and unicast polling.

Multicast polling may consist of the following steps:

1. The CH announcing a poll by transmitting a multicast poll descriptor in the FCB, wherein the multicast poll descriptor specifies the polled MNs and the time slots allocation for the poll responses. Each time slot is long enough to accommodate exactly one poll response.

2. Each polled MN transmits a poll response as discussed further below.

3. The CH may allocate time slots for clusterwide cooperative relaying of the poll responses. In some embodiments, when an MN successfully receives and decodes poll response in a certain time slot within the original allocation, the MN may then transmit the message in the same time slot within the relay allocation. Therefore in these embodiments, since there may be no more than one intermediate MN between the CH and any other MN, the CH may allocate the same number of time slots for relaying as the number of time slots for poll requests.

Referring now to FIG. 7, showing an example of propagation of multicast poll response in a network, in accordance with some embodiments of the disclosed subject matter.

As shown in graph 700, a poll response transmitted by MN J is received directly by the neighboring MNs, being A, B, I and H, but not by the CH, in accordance with connectivity graph 300.

Graph 704 shows the propagation when the polling response by J is relayed by MNs A, B, I and H, and is received by all their neighbors in connectivity graph 300, including the CH. It will be appreciated that in this example, the CH as well as other MNs may receive the poll response twice, from I and from B.

If the responding MN is only one hop away in the connectivity graph from the CH, then the CH may receive the poll response during two air frames: at polling timeslots 620 of a first air frame, and at clusterwide cooperative relay of multicast poll responses 624 of a following air frame when relayed by another MN. In each of the air frames, the CH, as well as other MNs, may receive the polling response twice or more from different MNs.

It will be appreciated that receiving the same message multiple times may enhance communication robustness, but on the other hand it can also increase collision probability. For example, if both MNs C and J were to transmit poll responses in the same timeslot within the original allocated time, then in accordance with interference graph 304, the transmissions will collide at the CHs receiver. The relayed transmission will also collide. Thus, the CH may omit multicast poll relaying if there is high probability, for example beyond a predetermined threshold, that the polled nodes are just one hop away, for example the network topology is such that many MNs are adjacent to the CH on the connectivity graph.

Figure 7A:
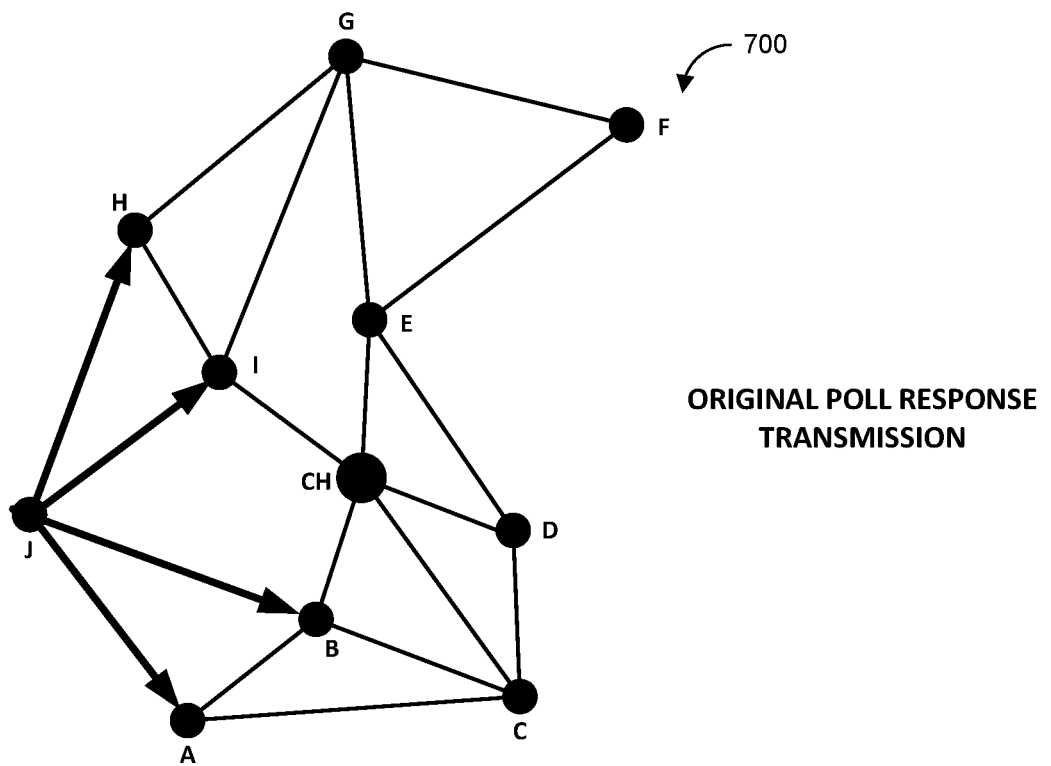
FIG. 7A illustrates an example of propagation of multicast poll response in a network, in accordance with some exemplary embodiments of the disclosure.
Figure 7A:
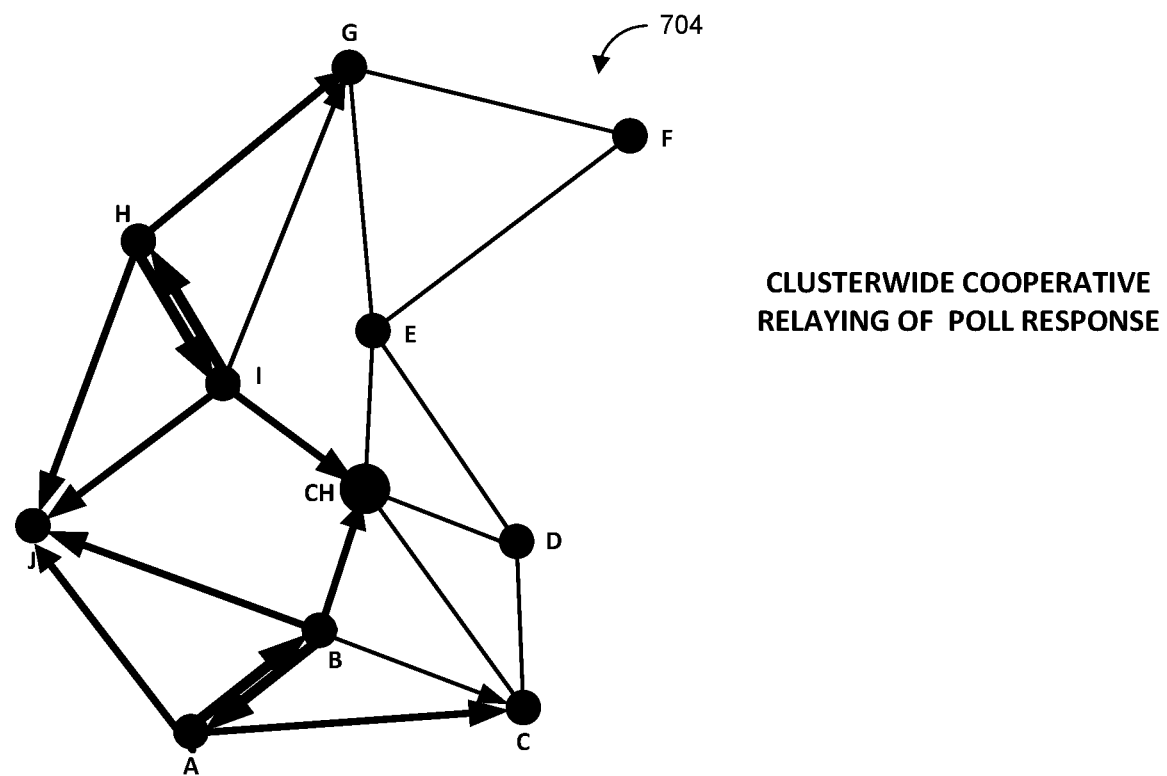
Figure 7B:
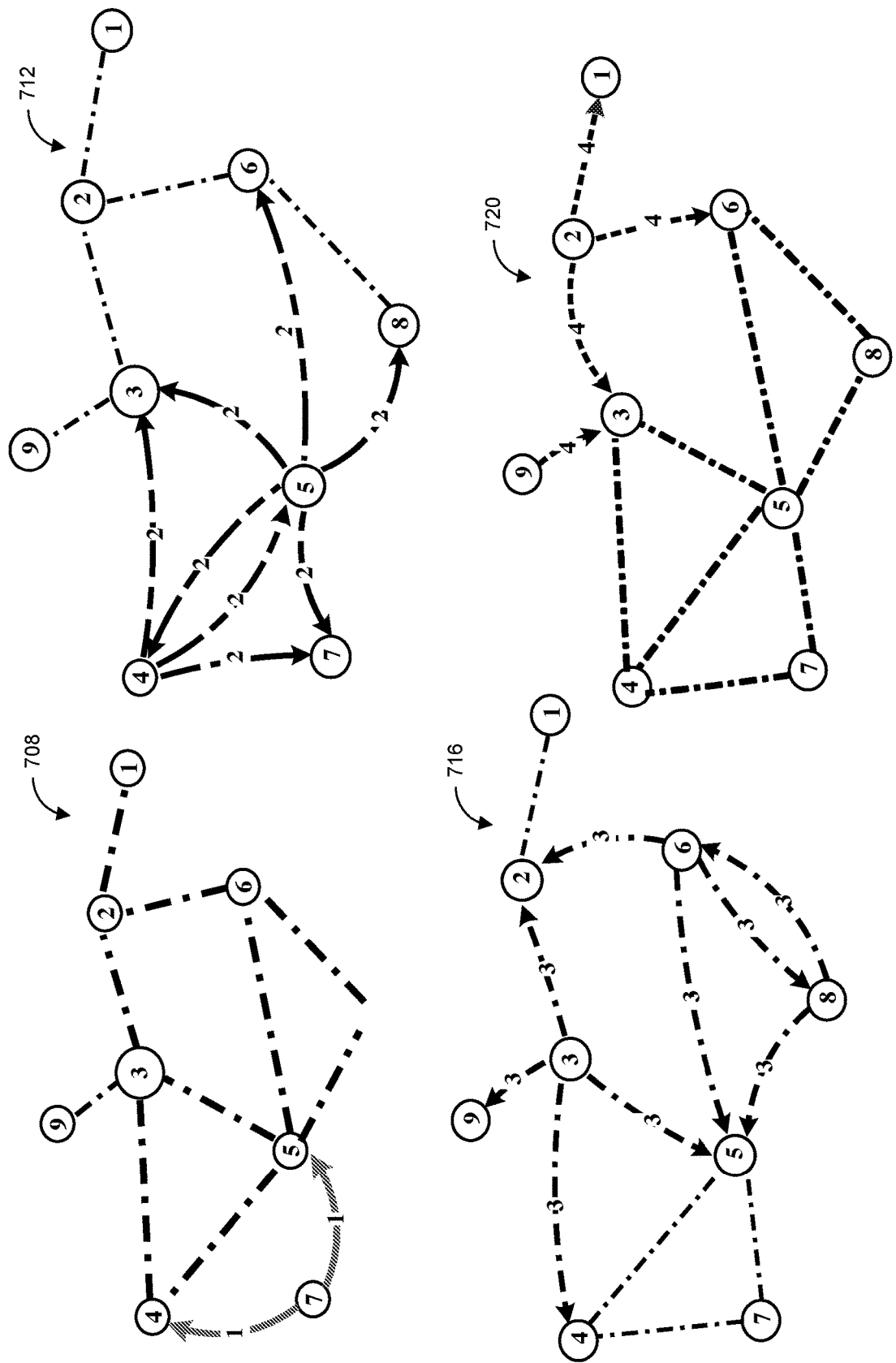
FIG. 7B illustrates another example of propagation of multicast poll response in a network where one retransmission is allowed, in accordance with some exemplary embodiments of the disclosure.
Figure 7C:
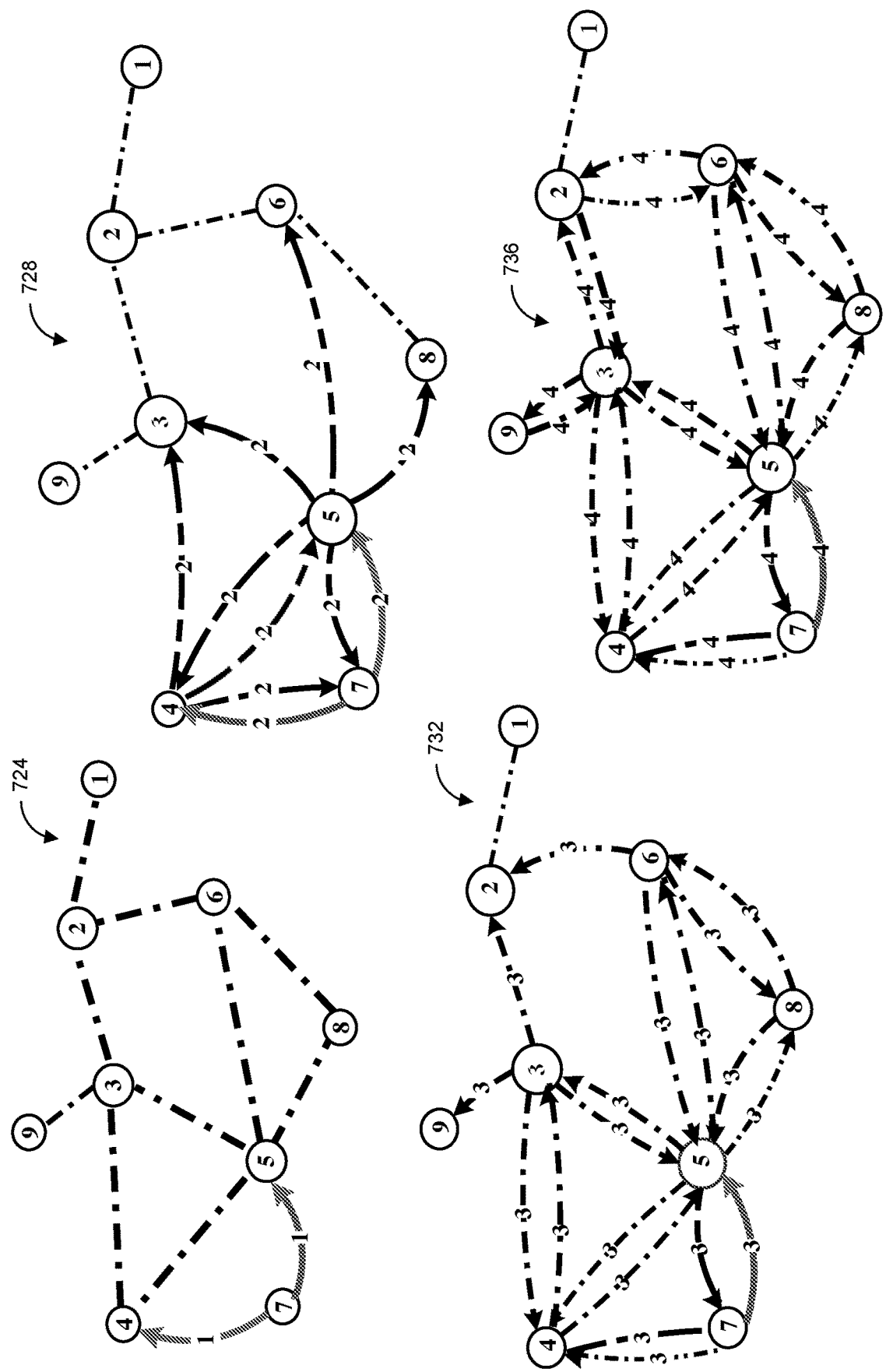
FIG. 7C illustrates another example of propagation of multicast poll response in a network where multiple retransmissions are allowed, in accordance with some exemplary embodiments of the disclosure.

Referring now to FIG. 7B, showing an example of message propagation of in a network where one retransmission is allowed, and to FIG. 7C showing propagation within the same network when multiple retransmissions are allowed.

FIG. 7B shows graphs 708, 712, 716, and 720, demonstrating the propagation of a signal transmitted by node 7 within one, two, three and four time slots, respectively, wherein each node can transmit or relay the information exactly once. For example, node 7 may transmit on timeslot 408 of FIG. 4, nodes 4 and 5 may transmit on timeslot 409, nodes 3, 6 and 8 may transmit on timeslot 410 and nodes 2 and 9 may transmit on timeslot 411.

FIG. 7C shows graphs 724, 728, 732 and 736, demonstrating the propagation of a signal transmitted by node 7 after one, two, three and four time slots, respectively, wherein each node can transmit or relay the information multiple times. For example, node 7 may transmit on timeslot 408 of FIG. 4, node 7 may repeat the transmission and nodes 4 and 5 relay, thus nodes 7, 4 and 5 may transmit on timeslot 409, and similarly nodes 7, 4, 5, 3, 6 and 8 may transmit on timeslot 410 and nodes 7, 4, 5, 3, 6, 8 and 9 may transmit on timeslot 411. The multiple transmissions increase energy consumption and interference probability, but also increases the probability of the messages being received.

In some embodiments, the multicast poll descriptor in the FCB may contain the following information: the number of contention slots allocated for the polling session; the time offset to the start of the original allocation; the time offset to the start of the relay allocation; and the IDs of the polled MNs, i.e., the MNs which may submit responses.

In addition to allowing existing MNs to request timeslots for transmitting information, multicast polling may also be enabled for MNs that are currently not part of the cluster and wish to join it, for example due to topology changes which brought an MN closer to other MNs in the cluster. Thus the network entry poll descriptor in the FCB does not contain the list of the polled MNs. In response to the network entry poll, an MN which requests to join the cluster may send a registration request using a random access technique. The rest of the communication, including relaying is as described above.

In some exemplary embodiments, unicast polling is provided in which the CH allocates exactly one timeslot for a specific polled MN. If the poll response needs to be relayed then the CH explicitly assigns the relaying role to one or more MNs. Thus the unicast poll descriptor in the FCB may include: the number of time slots allocated for the polling session; the time offset to the start of the original allocation; the time offset to the start of the relay allocation; and for each allocated time slot the ID of the polled MN and the IDs of MNs that have to relay the transmission. This scheme is suitable for most cases in which one relaying hop is sufficient. In unicast polling, am MN may be required to respond even when it does not need to reserve time for transmitting information.

When an MN needs to transmit a reservation request, i.e., to request a time slot for delivering information, it may use one of the time slots allocated for all MNs to deliver requests. In some embodiments of the disclosed subject matter, when multicast polling slots are scheduled, and wherein N denotes the number of time slots allocated, and M denotes the number of polled MNs, each polled MN may transmit in each time slot with probability 1/M. Alternatively each MN may randomly select one of the timeslots and transmit in the time slot with probability N/M. It is assumed that N is smaller than M. The CH may select N and M during a polling session based on an estimation of the contention probabilities. If the implementation allows the CH and the relaying MNs (CRs) to detect collisions, the CH may resolve the collision between nodes competing for randomly accessible air resources by creating and managing groups of competitors and assigning probabilities for random access. For example, a method such as tree search based contention resolution algorithm can be applied. The approach may be modeled using the Binary Search Tree Collision Resolution (BSTCR) method. If the CH detects a collision, it may divide the original group of polled MNs into two or more subgroups and polls each group separately. The process may repeat recursively until successful resolution of all collisions is obtained, i.e., all allocated time slots either contain valid transmissions or remain idle.

As for contention based reservation, the scheme below provides one possible implementation. It will, however, be appreciated that other implementations may be used.

In the following description, contender nodes are nodes that may transmit simultaneously, and thus compete on the same resource, being the timeslot for random access. If two contenders indeed transmit simultaneously they collide and the transmission fails. In this case the CH assists in resolving the collision by assigning lower transmission probabilities to the contenders.

Since the CH can detect collisions of contenders at one hop away from the CH, it needs to extract information about collisions caused by the distant contenders from the CRs. In order to extract the information, the CH may use unicast polling. In the poll responses, the CRs may deliver feedback about the detected collisions. It will be appreciated that there may be no need to poll all the CRs, but rather only those that are likely to receive transmissions of the potential contenders. The polling session feedback which is to be delivered to the CH may contain the following information:

The number of the air frame in which the reported polling session was scheduled. In many instances, it is the number of the current air frame. In any case, it is generally not required to report feedback on polling sessions that were scheduled more than two or three air frames ago;

If more than one polling session is scheduled in the same air frame, then sessions may be numbered starting from zero in the order their descriptors appear in the FCB.

A feedback for each slot allocated for the session. In some embodiments, the feedback may take three values: idle, successful reception or collision.

Additionally or alternatively, reservation requests in the form of Type-Length-Value (TLV) may be piggybacked on data or signaling transmissions.

As detailed below, within the cluster the route resolution is reduced to determining the destination location, i.e., the MN associated with the address to which is to be resolved resides. It will be appreciated that route resolution is a higher layer activity which relies on the transmission and relaying mechanisms described above, however from the "lower layer MAC" point of view the route information messages are transmitted and relayed as data messages, i.e., IP layer messages. Route resolution signaling may take the form of TLVs included in the MN to CH messages, such as poll responses, and CH to MNs broadcast i.e., FCB.

Figure 8:
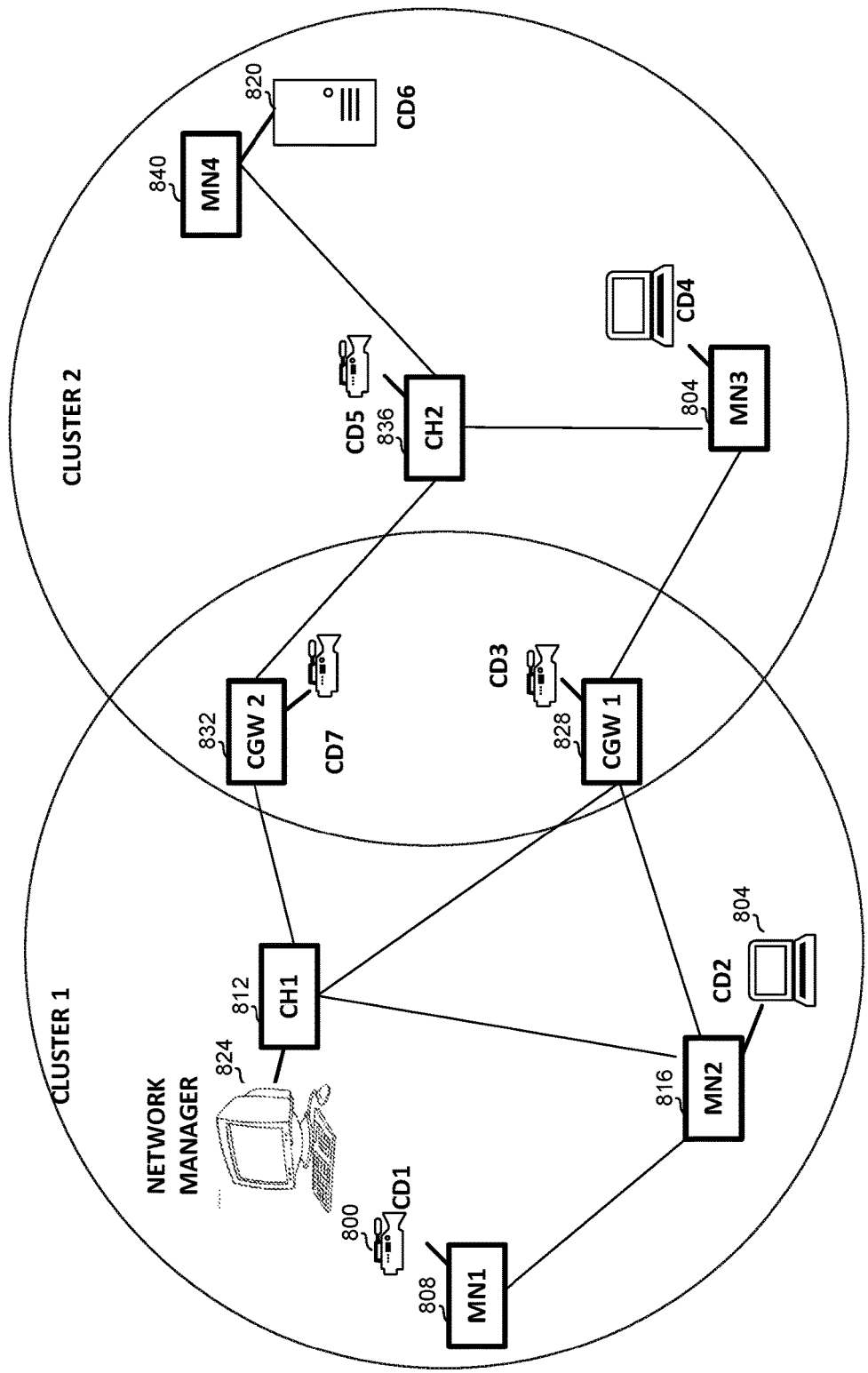
FIG. 8 shows an exemplary multi-cluster network, in accordance with some exemplary embodiments of the disclosure.
Figure 9:
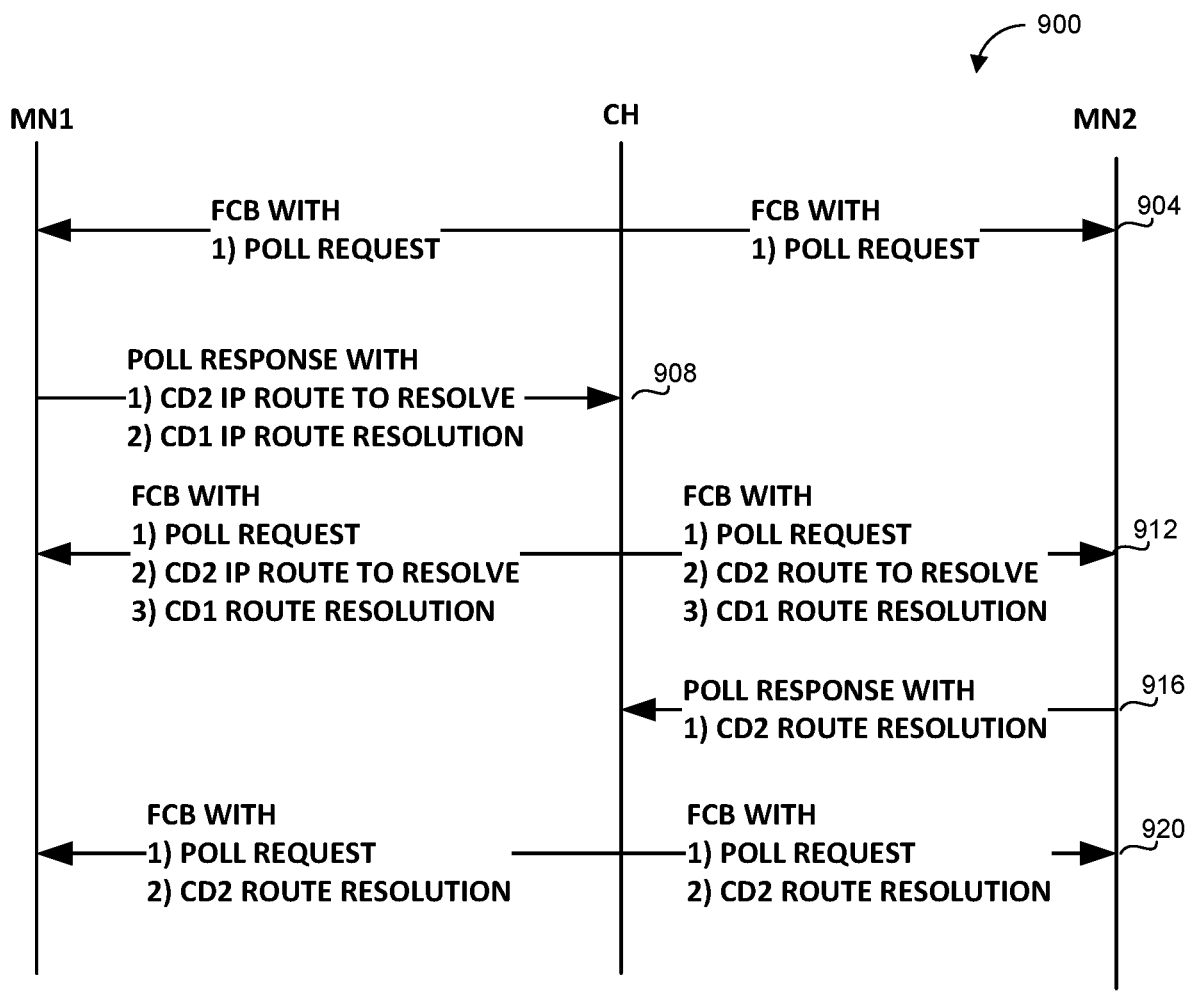
FIG. 9 shows the communications exchanged within the network of FIG. 8, in accordance with some exemplary embodiments of the disclosure.

Referring now to FIG. 8 showing an exemplary network in accordance with the disclosed subject matter and to FIG. 9 showing the communications exchanged within the network. Suppose CD1 800 initiates a communication session to CD2 804. After completing a Proxy ARP stage as detailed below, CD1 800 sends an IP datagram with CD1 800 IP address as the source address and CD2 804 IP address as the destination address. The intracluster signaling being exchanged may be described in accordance with FIG. 9, in which the events may unfold as follows:

MN1 808 waits for an opportunity to transmit a message to CH1 812. This opportunity may be indicated as poll request 904 sent by CH1 812.

MN1 808 sends poll response 908 which may include two TLVs: IP Route to Resolve, which indicates that a route to CD2 804 IP Address needs resolution; and CD1 800 IP address Route Resolution which informs on the route resolution of the CD1 800 IP Address. This is done to proactively resolve the reverse route—from CD2 804 to CD1 800.

CH1 812 sends an airframe 912 comprising an FCB includes both TLVs in the FCB. CH1 812 may also allocate Poll Request opportunities to allow the relevant MNs to answer. Every MN which receives CD1 800 Route Resolution TLV may update its routing tables and every MN which receives CD2 804 Route to Resolve TLV checks whether CD2 804 IP Address resides behind it. Determining whether a certain address is associated with an MN is detailed below.

MN2 816 may send Poll Response 916 with CD2 804 Route Resolution.

CH1 812 may include CD2 804 Route Resolution and send FCB 920. CH1 812 may broadcast all the route resolution signals in order to allow all MNs in the cluster to learn routes in advance and avoid unnecessary signaling in the future.

Each resolved route may be valid for a predetermined time period which may be referred to as route aging time. When the route aging time for a certain route has expired, the route may need to be resolved anew.

It may happen that a certain MN has an error related to a certain route resolution, due for example to movement of an MN, which makes the route information invalid. In this case, when the MN tries to send data to an intended destination, the data may be routed to a wrong MN. In this case the MN which received wrongly routed data may, on a first opportunity, send a route resolution error TLV to the CH. The CH may broadcast the TLV, thus informing every cluster member that the route is no longer valid.

Referring now back to FIG. 1 showing a network with multiple clusters. As detailed above, the mesh network comprises a multiplicity of clusters, each comprising at most a predetermined number of MNs. Each cluster operates at a frequency channel such that if a number of clusters partially overlap they do not interfere with one another. The radio resources within each cluster are centrally allocated and scheduled by a CH mesh node.

Intracluster mobility is transparent to the IP layer communications. The mobility events which affect IP layer are as follows:

1. An MN leaves one cluster and joins another. This is analogous to handover between base stations in cellular networks.

2. A cluster splits into two or more smaller clusters.

3. Two or more clusters join together and form one large cluster. It will be noted that the combined cluster can still not contain more than the predetermined number of MNs.

4. An MN leaves its serving FA and registers with a new FA. This is analogous to changing ASN gateway in WiMAX networks or S-GWs in LTE networks. As MIP Proxy the MN also takes care of registering the CD attached.

The above mentioned events may affect the IP layer communications of the MNs and the CDs attached. No such event may force a CD to change its IP address.

Mobile mesh IP networking may require a number of tasks:

Proxy Address Resolution Protocol (ARP) is a technique by which a device on a given network responds to the ARP queries for a network address that is not on that network. Serving as an ARP Proxy for another host effectively directs LAN traffic to the Proxy. The "captured" traffic, i.e., the traffic that would not be transmitted by the proxy ARP node since the proxy ARP node pretends to be the traffic destination at the Ethernet layer, may then be routed by the proxy to the intended destination via another interface or via a tunnel.

Proxy ARP has been recognized as a technique for implementing transparent subnet gateways: a setup that involves two or more physical segments sharing the same IP subnet and connected together via a router, as detailed in the RFC 925 and RFC 1027 protocols, which detail how an MN may handle ARP requests from CDs attached to its Ethernet port. However, in some embodiments of the disclosure, when an MN receives an ARP Request from the Ethernet interface, it responds with a dummy virtual MAC address and not with its own hardware address. The MN may allocate a new dummy MAC address for each new IP address to resolve. Thus in the CD's ARP table, each IP address may be associated with one MAC address and vice versa. The MN may also store these IP to MAC associations and use them to respond to Reverse ARP Requests.

Figure 10:
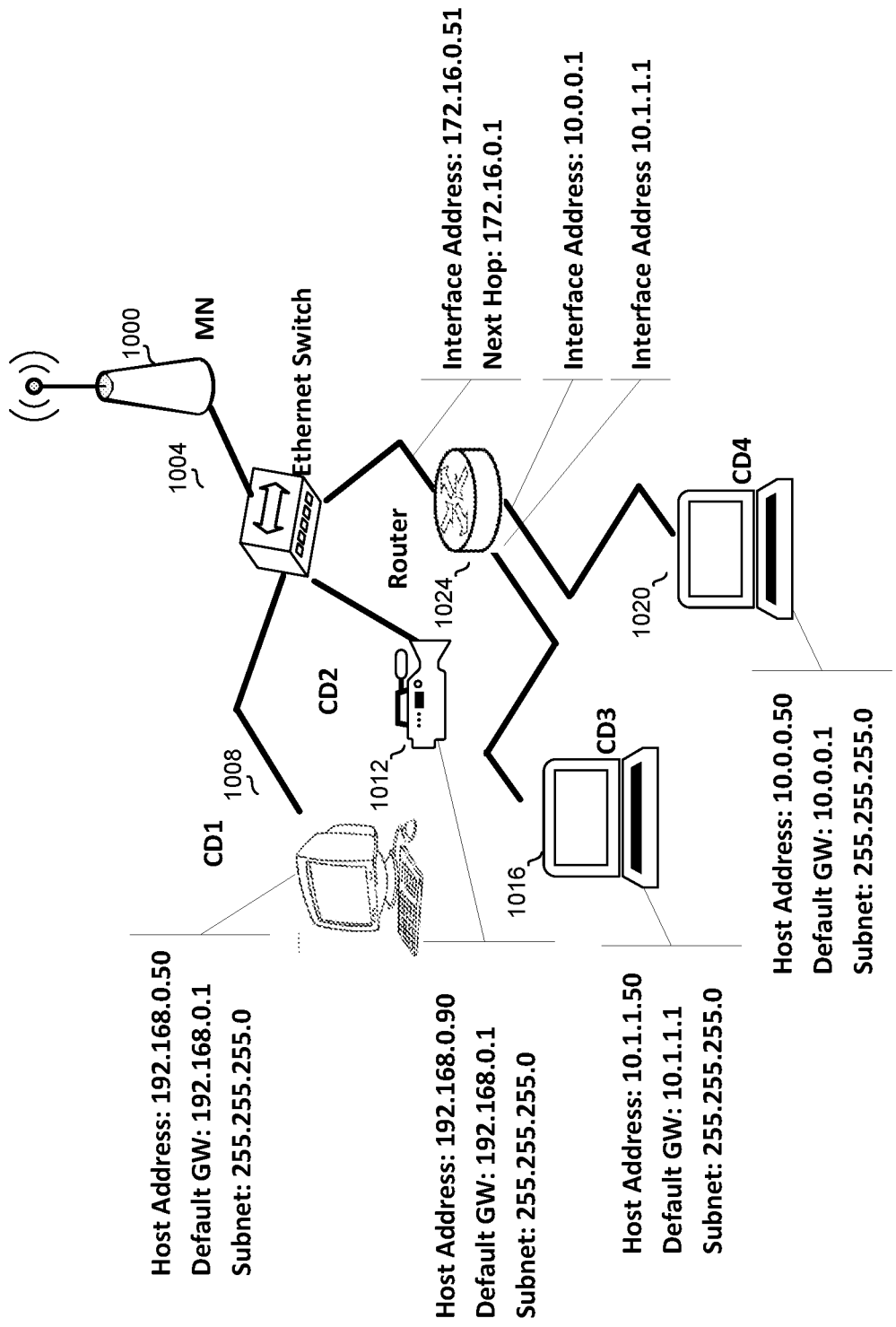
FIG. 10 shows an exemplary network of CDs behind an MN, in accordance with some exemplary embodiments of the disclosure.

Referring now to FIG. 10, showing an example of network of CDs behind MN 1000. The term "behind" in this context relates to entities accessed only via the respective MN. If CD1 1008 needs to send an IP datagram to a certain destination outside its subnet, it will first send an ARP request to resolve the MAC address of its default gateway: 192.168.0.1. The Ethernet switch may forward the ARP request to MN 1000. MN 1000 will resolve IP address 192.168.0.1 to the MAC address 00-00-00-00-00-A0, or any other virtual MAC address. CD1 1008 may then send its datagram to this MAC address. MN 1000 may will terminate the Ethernet layer, strip the MAC header and forward the IP datagram.

If CD2 1012 also needs to send an IP datagram to a destination outside of its subnet, it will also issue an ARP request to resolve 192.168.0.1: the default gateway address. Since MN 1000 has already resolved this IP address it will respond with the same MAC: 00-00-00-00-00-A0.

If CD2 1012 needs to send an IP datagram to a destination which is within the subnet, for example 192.168.0.100, it will send an ARP request to resolve this IP address. MN 1000 will answer with another virtual MAC address, for example, 00-00-00-00-00-B0.

A problem may arise if CD2 1012 needs to send a datagram to CD1 1008. Since both hosts share the same IP subnet, CD2 1012 may send ARP to resolve the destination address: 192.168.0.50. If the Ethernet switch 1004 delivers the ARP request to both MN 1000 and CD2 1012, both will respond and may cause addressing mismatch. In order to disable such a possibility, Ethernet switch 1004 may be configured to disable forwarding Ethernet broadcasts, or Ethernet frames at all, between the client ports. MN 1000 in this case may have to route back the datagrams from CD1 1008 to CD2 1012 and vice versa.

A more conventional solution may be to deploy an IP router 1024 instead of Ethernet switch 1004. For example, CD3 1016 and CD4 1020 can communicate with one another without any assistance from MN 1000. If router 1024 needs to forward datagrams to the network, it sends them to the MAC address of the next hop. MN 1000 may resolve the IP address of the next hop—176.16.0.51 to yet another virtual MAC address e.g. 00-00-00-00-00-D0. It will be appreciated that two components, such as MN 1000 and CD4 1020 may have the same management IP, for example 10.0.0.50, which is fine since by default they belong to different virtual networks, Virtual networking may be performed as follows: while a user is responsible for configuring her IP hosts, an operator may independently assign IP addresses to the MNs. In order to avoid the need for addressing coordination the MN may support virtual networking. By default all MNs as well as the hosts that run the network management applications may be assigned to virtual network 0 while the rest of the devices attached to the MNs may be assigned to virtual network 1. The MN routes datagrams by the combination of the destination IP and virtual network identifier. Thus, even if an MN and a CD attached to it have the same IP address, there is no addressing conflict therebetween.

A Virtual network identifier is a label with the virtual network number. The label is inserted by an MN when data arrives from the attached CD and is removed in the opposite direction. This identifier may be of any format, a format of an existing virtual networking technology may be adopted for easier integration with that technology. Some of these technologies include IEEE VLANs and IETF MPLS. The used technology should be consistent with the technology supported by the available Mobile IP Foreign agents and Home Agents.

It will be appreciated that in some circumstances more than two virtual networks may be required. For example, two disjoint clusters may be independently configured wherein the CDs in both happen to have the same IP addresses. Eventually one of the MNs becomes a CGW which connects the clusters together. However, since identical IP addresses are assigned to different nodes, normal IP communication becomes impossible. Traditionally, IP renumbering is required in such case, which might be logistically difficult especially in the case when the CDs have been configured manually, and thus must be reconfigured manually as well. However, in the virtual networking environment the situation can be resolved by MNs of one of the clusters changing their virtual network identifiers while CDs are not required to change.

A customer may desire to have CDs attached to an MN to belong to several virtual networks. In order to support multiple virtual networks the MN should be capable of classifying incoming traffic, and mapping the frames onto different virtual network by some classification criteria. For example, the data may be classified and mapped onto virtual networks by the VLAN IDs in the MAC header. Alternatively, It may be possible to use for classification purposes the source MAC address or any field in a packet.

Discovering the destination location and route, may be performed as follows: the mesh network is actually a mobile ad-hoc network (MANET). MANETs may deploy one or more ad-hoc routing protocols in order to find a route between the source and destination across the wireless mesh. Ad-hoc routing protocols can be roughly divided into proactive and reactive.

In proactive protocols, each node may maintain a routing table where data packets are broadcasted periodically within the network. The routes between all the source-destination pairs are computed each time a change in the network topology is detected. When a source node requests to transmit data from source to destination, it searches the routing table to find a destination node match. Optimized Link State Routing (OLSR), Destination Sequenced Distance Vector (DSDV), Wireless Routing Protocol (WRP), Cluster Switch Gateway Routing (CGSR), Source Tree Adaptive Routing Protocol (STAR) are some examples of proactive protocols. Proactive routing may require announcing of a CD's IP address and virtual network ID upon attaching the CD to the Ethernet port of an MN. This may prove tricky because the CD will not necessarily send any messages upon attachment.

In reactive protocols, the routes are discovered only when the source needs to transmit the data, so the control packets overhead will be reduced. The source discovers the rout by broadcasting Route Request (RREQ). When a source's neighbor receives the RREQ message, it has two options: a) if a route to the destination is known or if the neighbor is the destination, it can send a Route Reply (RREP) message back to the source, and b) rebroadcast the RREQ to its set of neighbors and the process repeats. Dynamic Source Routing Protocol (DSR); Ad-Hoc On-Demand Distance-Vector Routing Protocol (AODV); Temporally Ordered Routing Algorithm (TORA); Location-Aided Routing Protocol (LAR); Cluster Based Routing Protocol (CBRP) are some examples of reactive protocols. A full blown reactive routing protocol may run between the cluster gateways (CGWs) but within the cluster the RREQ—RREP exchange may serve just for discovering the destination.

In cluster based routing such as CBRP the nodes do not broadcast RREQ but unicast to their cluster heads. The cluster head may then either a) answer the request if it knows the destination location and route; b) broadcast the message to the cluster members if it holds no information about the destination; or c) forwards the message to the gateways, which in turn deliver it to the cluster heads of the neighboring clusters, only if it knows that the destination exists but not within its own cluster.

Some real life routing protocols incorporate reactive and proactive features. This is, for example, the case with Hybrid Wireless Mesh Protocol (HWMP), the routing protocol adopted for the IEEE 802.11. This protocol combines features of the reactive AODV and proactive Tree Based Routing. While unknown route discovery may be done reactively, it is advantageous if CGWs proactively update the network in cases they join a new cluster or leave one, as such event may affect the routes across the network.

Referring now back to FIG. 8, showing a two-cluster mesh network in accordance with some embodiments of the disclosed subject matter.

The IP host configuration of the selected nodes appear as in Table 1 below:

TABLE 1

| Device | Virtual Network | IP Address | Default GW | Subnet |
|---|---|---|---|---|
| CD1 | 1 | 192.168.0.31 | 192.168.0.1 | /24 |
| CD3 | 1 | 192.168.0.14 | 192.168.0.1 | /24 |
| CD5 | 1 | 172.16.0.51 | 172.16.1.1 | /20 |
| CD6 | 1 | 10.0.0.99 | 10.0.0.1 | /24 |
| MN1 | 0 | 10.0.0.95 | 10.0.0.1 | /24 |
| CGW1 | 0 | 10.0.0.96 | 10.0.0.1 | /24 |
| CH2 | 0 | 10.0.0.97 | 10.0.0.1 | /24 |
| MN2 | 0 | 10.0.0.99 | 10.0.0.1 | /24 |
| Network manager | 0 | 10.1.1.99 | 10.1.1.1 | /24 |

Assume CD1 800 needs to send data to CD6 820. Since the IP address of CD6 820 belongs to a different subnet, CD1 800 needs to forward datagrams to its Default GW 192.168.0.1.

If this is the first time CD1 800 sends any data and it has not yet learned the MAC address associated with 192.168.0.1, then CD1 800 may send an ARP Request to resolve this IP address. It is noted that no node with such address exists, however this is not a problem since MN1 808 answers on behalf of 192.168.0.1 and informs CD1 800 that the associated MAC address is, for example, 00-00-00-00-00-E0.

CD1 800 sends a frame with Ethernet destination address set to 00-00-00-00-00-E0 and the IP destination address set to 10.0.0.99, the address of CD1 800.

When MN1 808 receives the frame from CD1 800 it sends RREQ to find the destination. The address of Network Manager 824 is also 10.0.0.99 but it belongs to the virtual network 0. Thus to avoid addressing collision MN1 808 sets the destination virtual network identifier to 1. MN1 808 does it for every frame which arrives from the Ethernet interface.

MN1 808 unicasts RREQ to CH1 812. CH1 812 may already know that the destination resides in the other cluster. In this case it needs either to multicast RREQ to CGW1 828 and CGW2 832 or to unicast the message to either of them. If CH1 812 does not know the whereabouts of the address 10.0.0.99, it broadcasts the RREQ to every MN in Cluster 1. CGW1 828 and CGW2 832 forward the message to CH2 836 which in turn acts exactly as CH1. Forwarding may be performed not simultaneously, thus the later message may be discarded.

The MNs, including CHs 1 812 and CH2 836 that do not know yet the IP addresses of their respective CDs send ARP requesting resolution of 10.0.0.99 to their Ethernet interfaces. CH1 812 however will not do that because its configuration declares that its Ethernet interface belongs to virtual network 0. Thus no addressing collision happens.

CD6 820 responds to the ARP Request and MN4 840 sends back the RREP message. Thus the location of and the route to the destination have been found and communication may commence.

If a CD is attached to an MN via a router as shown in FIG. 10, then an ICMP echo, also referred to as ping, should be sent to the destination IP address instead of ARP Request. The MN will use this method whenever it detects router advertisements arriving from the Ethernet interface. The ping will be sent to the destination IP address and the router's MAC address. The later will be learned from the routing advertisements.

The IP networking solution relies on Mobile IP for mobility within an arbitrary wide area, referred to as macro-mobility. The Mobile IP infrastructure may support the standard MIPv4 as defined in RFC 5944 and thus can be organized using off-the-shelf FAs and HAs. For its own macro-mobility, the MN will may run an ordinary MIPv4 client. Since the CD cannot always be expected to support IP mobility natively, the MN should provide for a Proxy Mobile IP Client (PMIP) for the CD attached to it.

PMIP should support both dynamic and static IP address allocation mechanisms for CDs. For a static CD IP address, the MN may learn the pre-configured IP address of a CD attached through ARP during the route discovery phase as explained above. Then the PMIP client in MN provides the IP address in the MIP registration to the HA, and allows the CD to use the IP address when HA accepts the registration.

For dynamic IP address allocation for the CD, the MN may implement a proxy DHCP server. In this case the MN does not provide the CD's IP address in the MIP registration and the HA assigns an IP address to the CD based on its own address allocation scheme (AAA, DHCP, local pool, etc.) in the registration reply. The MN may terminate the registration replay of behalf of the CD and may then need to deliver the address to the CD. The may be done with DHCP messages.

It will be appreciated that it is possible to deploy PMIP client on behalf of CD in the FA itself.

The virtual networking within the mobile mesh needs to be integrated with the Virtual Routing and Forwarding (VRF) in the infrastructure network. VRF is likely to be associated with MPLS VPNs which may be implemented in many products.

With standard Mobile IP the mobile clients may learn about presence of FAs by listening to periodic agent advertisement broadcasts. Consequently, a mobile client may figure out that a certain FA is no longer reachable it the advertisement broadcasts cease arriving. In the mesh environment such an approach may prove suboptimal. First, it may cause unnecessary broadcasts in all the clusters and thus waste radio resources. Second, any changes in FA reachability may immediately affect a lot of routes and should therefore be discovered as soon as possible.

In order to satisfy the above mentioned requirements the IGW should not forward FA advertisements, i.e., messages with information about itself. Instead it may include an FA identity in its route updates. The routes between the IGWs and the CGWs within the mesh will be proactively monitored and updated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise" "include" and "have", and forms thereof, are not necessarily limited to members in a list with which the words may be associated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A collaborative network, comprising:
   a cluster of a plurality of nodes, each of the plurality of nodes comprising a wireless transceiver,
   wherein each of the plurality of nodes is capable of operating as a cluster head and as a mesh node,
   wherein a first node of the plurality of nodes is dynamically configured to operate as the cluster head which is to allocate for other nodes time slots for transmission in accordance with a connectivity mesh scheme constructed dynamically based on reception quality by the plurality of nodes, the first node is to determine the connectivity mesh scheme in accordance with connectivity levels and interference levels between node pairs reported by nodes in the cluster, and
   wherein all nodes in the plurality of nodes except the first node are dynamically configured to operate as mesh nodes, receiving and transmitting information, wherein transmitting the information is in accordance with the connectivity mesh scheme.

2. The collaborative network of claim 1, wherein the transceiver of each node of the plurality of nodes is adapted to transmit and receive data in two channels, and the plurality of nodes communicate over one channel of the two channels.

3. The collaborative network of claim 1, wherein all nodes except the first node are capable to receive information transmitted by the first node.

4. The collaborative network of claim 1, wherein all nodes except the first node are adapted to receive information, and to relay the information in accordance with the connectivity mesh scheme.

5. The collaborative network of claim 1, wherein multiple nodes of the plurality of nodes are to collaborate in transmission.

6. The collaborative network of claim 1, wherein multiple nodes of the plurality of nodes are to collaborate in synchronous transmission by transmitting and relaying or repeating data synchronously.

7. The collaborative network of claim 6, wherein the synchronous transmission is in accordance with the connectivity mesh scheme.

8. The collaborative network of claim 1, wherein the first node is to determine the connectivity mesh scheme in intervals according to a rate of changes in reported connectivity levels.

9. The collaborative network of claim 1, wherein the plurality of nodes are configured to use Media Access Control (MAC) layer relaying for transmitting commands from the cluster head, and Logical Link Control (LLC) layer relaying for repeating data received from other nodes.

10. The collaborative network of claim 1, wherein the cluster of the plurality of nodes is configured to comprise a common node, which is common with an other cluster of nodes.

11. The collaborative network of claim 10 wherein the cluster of the plurality of nodes is configured to use a first channel different from a second channel of the other cluster of nodes, and wherein the common node is to communicate using the first and second channels.

12. The collaborative network of claim 1, wherein at least one of the plurality of nodes has a client device connected to thereto.

13. The collaborative network of claim 1, wherein the collaborative network is configured to be integrated into a global Mobile IP (MIP) infrastructure.

14. A method to be performed a collaborative network, the method comprising:
    forming a cluster of a plurality of nodes, each of the plurality of nodes comprising a wireless transceiver,
       wherein each of the plurality of nodes is capable of operating as a cluster head and as a mesh node,
       wherein a first node of the plurality of nodes is dynamically configured to operate as the cluster head which is to allocate for other nodes time slots for transmission in accordance with a connectivity mesh scheme constructed dynamically based on reception quality by the plurality of nodes, and
       all nodes in the plurality of nodes except the first node are dynamically configured to operate as mesh nodes, receiving and transmitting information, wherein transmitting the information is in accordance with the connectivity mesh scheme;
    determining by the cluster head the connectivity mesh scheme for transmitting messages within the cluster, determining the connectivity mesh scheme comprises determining the connectivity mesh scheme in accordance with connectivity levels and interference levels between node pairs reported by nodes in the cluster; and
    transmitting a message within the cluster, wherein nodes transmit or relay the message in a timeslot in accordance with the connectivity mesh scheme, synchronously with other nodes.

15. The method of claim 14, comprising using Media Access Control, (MAC) layer relaying for transmitting commands from the cluster head, and Logical Link Control (LLC) layer relaying for repeating data received from other nodes.

16. The method of claim 14, comprising determining the connectivity mesh scheme in intervals according to a rate of changes in reported connectivity levels.

17. The method of claim 14 comprising operating a common node of the cluster of the plurality of nodes, which is common with an other cluster of nodes, operating the common node comprises communicating in the cluster of the plurality of nodes using a first channel and communicating in the other cluster of nodes using a second channel different from the first channel.

18. The method of claim 14, further comprising integrating the collaborative network into a MIP infrastructure.

* * * * *